US011912451B2

(12) United States Patent
Nakamoto et al.

(10) Patent No.: US 11,912,451 B2
(45) Date of Patent: Feb. 27, 2024

(54) BAG SUPPLY METHOD AND BAG SUPPLY APPARATUS

(71) Applicant: TOYO JIDOKI CO., LTD., Tokyo (JP)

(72) Inventors: Kakue Nakamoto, Yamaguchi-ken (JP); Kazuo Fukunaga, Yamaguchi-ken (JP); Manabu Morino, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 463 days.

(21) Appl. No.: 17/197,530

(22) Filed: Mar. 10, 2021

(65) Prior Publication Data

US 2021/0292021 A1 Sep. 23, 2021

(30) Foreign Application Priority Data

Mar. 18, 2020 (JP) ................................ 2020-048018

(51) Int. Cl.
*B65B 43/18* (2006.01)
*B65B 57/04* (2006.01)
*B31B 70/02* (2017.01)

(52) U.S. Cl.
CPC ............ *B65B 43/18* (2013.01); *B31B 70/022* (2017.08); *B65B 57/04* (2013.01)

(58) Field of Classification Search
CPC ................................ B65B 43/18; B65B 57/04
See application file for complete search history.

(56) References Cited

U.S. PATENT DOCUMENTS 7,581,370 B2 * 9/2009 Koga .................... B65B 43/123 271/69
8,122,692 B2 * 2/2012 Inoue ...................... B65B 43/14 53/386.1
9,815,580 B2 * 11/2017 Vaucher ............... B25J 15/0616

(Continued)

FOREIGN PATENT DOCUMENTS

DE 3416567 A1 12/1985
EP 2014558 A1 1/2009

(Continued)

OTHER PUBLICATIONS

Notice of Reasons for Refusal dated Apr. 21, 2023, issued in corresponding Japanese Patent Application No. 2020-048018 with English translation (8 pgs.).

(Continued)

*Primary Examiner* — Patrick Cicchino
(74) *Attorney, Agent, or Firm* — Pillsbury Winthrop Shaw Pittman, LLP

(57) ABSTRACT

A bag supply method includes the steps of: causing an arrangement device to arrange a bag at a pickup position; delivering the bag from the pickup position to a support device via a bag pickup device; moving the bag along with the support device in a traveling direction along a movement path including a detection position; determining arrival of the bag at the detection position; stopping the bag along with the support device on the movement path according to a timing when the bag arrives at the detection position; and delivering the bag stopped in the movement path, from the support device to a bag receiving device via a bag holding conveyance device.

14 Claims, 19 Drawing Sheets

(56) References Cited

U.S. PATENT DOCUMENTS

| | | | | |
|---|---|---|---|---|
| 9,864,096 | B2 * | 1/2018 | Fujitomi ............... | B65B 43/465 |
| 2007/0204570 | A1 * | 9/2007 | Okazaki .................. | B65B 43/60 53/459 |
| 2015/0251790 | A1 | 9/2015 | Nakamoto et al. | |
| 2015/0274336 | A1 * | 10/2015 | Kaneko ................... | B65B 43/18 53/79 |
| 2023/0192422 | A1 * | 6/2023 | Haering ............... | B65G 47/917 221/211 |

FOREIGN PATENT DOCUMENTS

| | | | |
|---|---|---|---|
| EP | 2149499 | A1 | 2/2010 |
| EP | 3192743 | A1 | 7/2017 |
| JP | 2006-143264 | A | 6/2006 |
| JP | 2006-240649 | A | 9/2006 |
| JP | 2015-168456 | A | 9/2015 |

OTHER PUBLICATIONS

Extended European Search Report dated Aug. 19, 2021, issued in corresponding European Patent Application No. 21160451.7 (8 pgs.).

* cited by examiner

BAG SUPPLY METHOD AND BAG SUPPLY APPARATUS

CROSS-REFERENCE TO RELATED APPLICATIONS

This application is based upon and claims the benefit of priority from Japanese Patent Application No. 2020-048018, filed on Mar. 18, 2020; the entire contents of which are incorporated herein by reference.

TECHNICAL FIELD

The present invention is directed to a bag supply method and a bag supply apparatus.

BACKGROUND ART

There are known devices and methods which convey a bag while gripping the bag and sequentially conduct predetermined processes such as a packaging process or a bag making process (including, for example, a spout attachment process) (see Japanese patent application publication Nos. 2006-143264 and 2006-240649 for instance).

SUMMARY OF INVENTION

Technical Problem

In the packaging machine disclosed in Japanese patent application publication No. 2006-143264, the bottom edge part of a package bag is received by a stopper and the package bag is positioned by raising and lowering the stopper. Therefore, in cases where a package bag is a bag with low rigidity (for example, a thin empty bag), the package bag may be bent due to being received by the stopper. When a package bag is bent, the displacement of the package bag in the length direction occurs, which may cause disadvantages to the subsequent processes in the packaging machine.

In the packaging machine disclosed in Japanese patent application publication No. 2006-240649, the inclination of a package bag is corrected by the rotation of a suction cup. However, the rotation of the suction cup cannot always properly correct the misalignment in the length direction of a package bag.

The present disclosure has been contrived in view of the above circumstances, and an object of the present invention is to provide an apparatus and a method which are capable of correcting a misalignment in the length direction of a bag.

Solution to Problem

One aspect of the present invention is directed to a bag supply method including the steps of: causing an arrangement device to arrange a bag at a pickup position; delivering the bag from the pickup position to a support device via a bag pickup device; moving the bag along with the support device in a traveling direction along a movement path including a detection position; determining arrival of the bag at the detection position; stopping the bag along with the support device on the movement path according to a timing when the bag arrives at the detection position; and delivering the bag stopped in the movement path, from the support device to a bag receiving device via a bag holding conveyance device.

The arrangement device may arrange a plurality of bags held in a bag storage device one by one at the pickup position.

In the step of delivering the bag from the pickup position to the support device, the bag pickup device may hold the bag arranged at the pickup position Pt by vacuum suction, and the bag pickup device may be moved along with the bag in a state where the bag pickup device holds the bag by vacuum suction in such a manner that the bag is moved from the pickup position.

In the step of delivering the bag from the pickup position to the support device, the support device may hold both side edges of the bag and support the bag from below, and the bag pickup device may release holding of the bag.

In the step of moving the bag along with the support device in the traveling direction, the support device may move in the traveling direction while holding both side edges of the bag.

In the step of delivering the bag from the support device to the bag receiving device, the bag holding conveyance device may hold the bag being supported by the support device, and the bag holding conveyance device may be moved along with the bag in a state where the bag holding conveyance device holds the bag, and the bag may be released from holding by the support device.

The bag holding conveyance device may hold one end of the bag with respect to the traveling direction, and the bag receiving device may hold both side edges of the bag.

Another aspect of the present invention is directed to a bag supply apparatus comprises: an arrangement device which arranges a bag at a pickup position; a bag position adjustment device which includes a support device; a bag pickup device which moves the bag from the pickup position and delivers the bag to the support device; a bag detection sensor which determines arrival of the bag at a detection position; a bag receiving device; and a bag holding conveyance device which receives the bag from the support device and delivers the bag to the bag receiving device, wherein: the support device moves the bag in a traveling direction along a movement path including the detection position and stops the bag according to a timing when the bag reaches the detection position obtained from a detection result of the bag detection sensor, and the bag holding conveyance device carries the bag stopped in the movement path, from the support device to the bag receiving device.

The bag supply apparatus may comprise a bag storage device which holds a plurality of bags, wherein the arrangement device may arrange the plurality of bags held in the bag storage device one by one at the pickup position.

The bag pickup device may reciprocate between the pickup position and the bag position adjustment device, and the bag pickup device may hold the bag arranged at the pickup position by vacuum suction and move in a state of holding the bag by vacuum suction to move the bag from the pickup position.

The support device may hold both side edges of the bag and support the bag from below.

The support device may move in the traveling direction while holding both side edges of the bag.

The support device may include: a side edge support device which holds both side edges of the bag; and a lower support device which supports the bag from below, and the side edge support device may be driven based on a hold mode in which the bag is held and on a release mode in which the bag is released.

The support device may include: a first side edge support device which holds one side edge of the bag; a second side edge support device which holds another side edge of the bag; a first support drive device which causes the first side edge support device to move back and forth in the traveling direction; and a second support drive device which causes the second side edge support device to move back and forth in the traveling direction, and each of the first side edge support device and the second side edge support device may be driven based on a hold mode in which the bag is held and on a release mode in which the bag is released.

In the hold mode, each of the first side edge support device and the second side edge support device may hold the bag while allowing rotation of the bag.

The bag holding conveyance device may hold one end of the bag with respect to the traveling direction, and the bag receiving device may hold both side edges of the bag.

According to the present disclosure, it is possible to correct a misalignment in the length direction of a bag.

DESCRIPTION OF EMBODIMENTS

Figure 1:
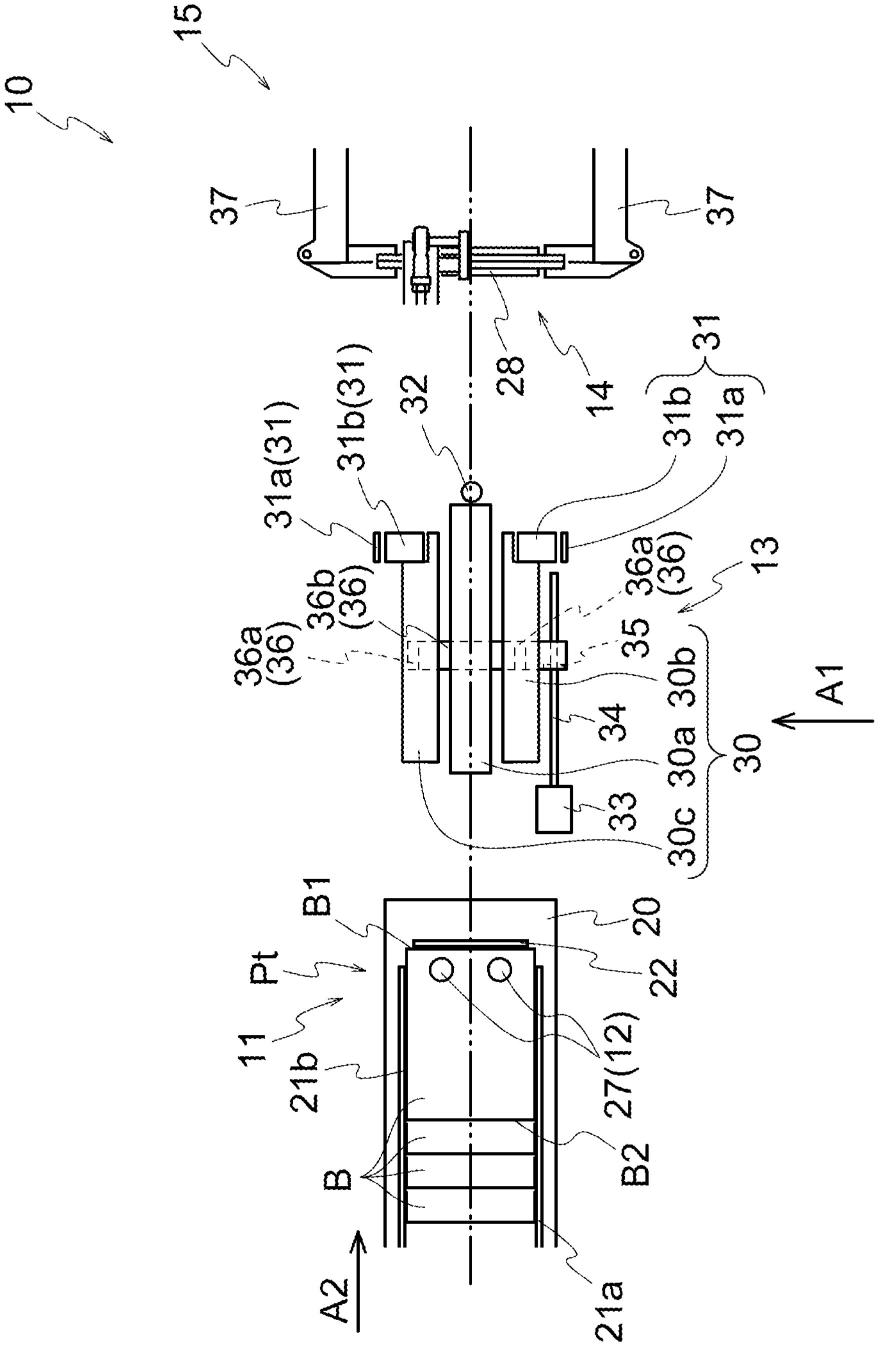
FIG. 1 is a plan view showing a schematic configuration of a bag processing system.
Figure 2:
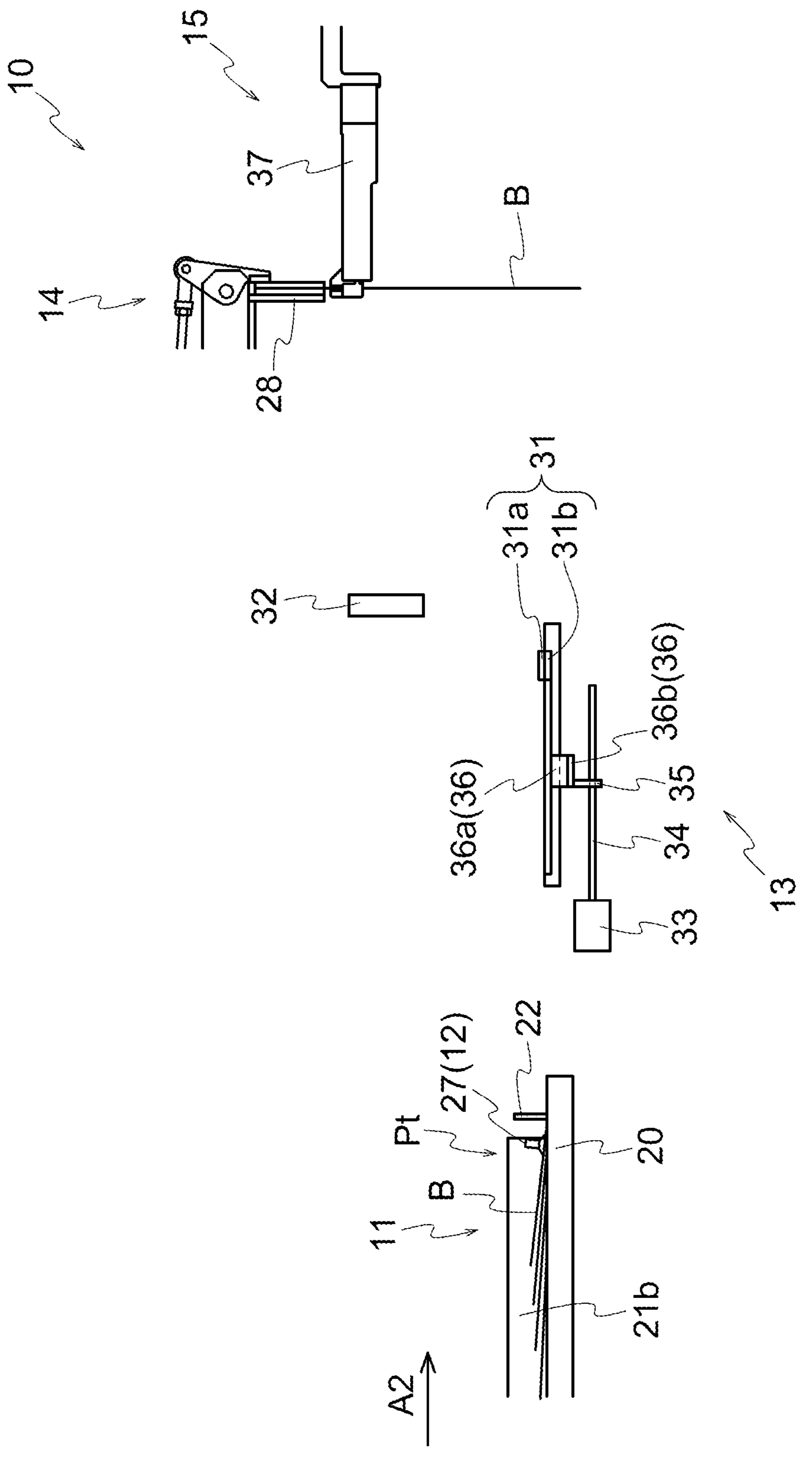
FIG. 2 is a side view showing a schematic configuration of the bag processing system as viewed in the direction of an arrow "A1" in FIG. 1.

FIG. 1 is a plan view showing a schematic configuration of a bag processing system 10. FIG. 2 is a side view showing a schematic configuration of the bag processing system as viewed in the direction of an arrow "A1" in FIG. 1. In FIG. 2, the illustration of a first side guide 21*a* is omitted.

The bag processing system 10 includes a bag storage device 11, a bag pickup device 12, a bag position adjustment device 13, a bag holding conveyance device 14, and a bag receiving device 15. The bag storage device 11, the bag position adjustment device 13 and the bag receiving device 15 shown in FIGS. 1 and 2 are arranged to be aligned on a line (see the dashed-two dotted line in FIG. 1) but may be arranged to be aligned in a non-linear manner.

The bag storage device 11 positions a bag B, which is to be sent downstream, at a pickup position Pt. The bag storage device 11 shown in FIGS. 1 and 2 includes a guide table 20, a plate-shaped first side guide 21*a*, a plate-shaped second side guide 21*b*, and a plate-shaped bag stopper 22 which are arranged to project upward from the guide table 20. A plurality of bags B stacked on top of each other are placed on the area on the guide table 20 surrounded by the first side guide 21*a*, the second side guide 21*b*, and the bag stopper 22, in a state where each bag B is slightly shifted from an adjacent bag B in the traveling direction A2.

Each bag B has a top portion B1 and a bottom portion B2. The top portion B1 is provided so that at least the central part in the width direction of the top portion B1 can be opened, and the bottom portion B2 is closed. The plurality of bags B placed on the guide table 20 have the same orientation as each other. The top portion B1 of each bag B is directed in the forward direction of the traveling direction A2 (in other words, in the right direction in FIGS. 1 and 2) and the bottom portion B2 of each bag B is in the opposite direction of the traveling direction A2 (in other words, in the left direction in FIGS. 1 and 2). Further, the two side wall portions extending between the top portion B1 and the bottom portion B2 of the plurality of bags B on the guide table 20 also have the same orientation as each other. Each bag B shown in FIGS. 1 and 2 is a flat bag (i.e., an empty bag) in which the side wall portions are in close contact with each other, and is placed on the guide table 20 in a state where one side wall portion (i.e., the front side wall portion) is oriented upward and the other side wall portion (i.e., the back side wall portion) is oriented downward.

A plurality of bags B on the guide table 20 are guided by the first side guide 21*a* and the second side guide 21*b* extending in the traveling direction A2 (i.e., the horizontal direction) to be sent in the traveling direction A2. Specifically, in a state where each bag B is placed on the guide table 20, the position in the width direction (see the horizontal direction (i.e., the vertical direction in FIG. 1) forming a right angle with the traveling direction A2) of each bag B can be accurately adjusted to a desired position by the first side guide 21*a* and the second side guide 21*b*.

The method of sending a plurality of bags B stored in the bag storage device 11 in the traveling direction A2 is not limited. For example, the portion of the guide table 20 on which a plurality of bags B are placed may be formed by a moving body such as a conveyor belt and the plurality of bags B may be sent in the traveling direction A2 along with the moving body. Further, a plurality of bags B on the guide table 20 may be pushed by a pushing body (not shown) in such a manner that the plurality of bags B are sent in the traveling direction A2 on the guide table 20. A leading bag B in the traveling direction A2 of the plurality of bags B on the guide table 20 (in the example shown in FIGS. 1 and 2, an uppermost bag B) is arranged at the pickup position Pt. The bag stopper 22 comes into contact with a bag B positioned at the pickup position Pt to prevent the bag B from further advancing in the traveling direction A2 from the pickup position Pt.

The bag stopper 22 regulates the position of each bag B in the length direction (i.e., the direction along the traveling direction A2 (in the example shown in FIGS. 1 and 2, the direction in which both side edges of each bag B extend)), but cannot necessarily adjust the length direction position of each bag B in a precise manner. For example, when the conveyance of a plurality of bags B on the guide table 20 in the traveling direction A2 is insufficient, the leading bag B might be arranged at the pickup position Pt without coming into contact with the bag stopper 22. In the bag processing system 10 of the present embodiment, the length direction position of each bag B is accurately adjusted to a desired position by the bag position adjustment device 13, as will be described later.

The bag pickup device 12 carries a bag B from the bag storage device 11 to the bag position adjustment device 13. The bag pickup device 12 of the present embodiment lifts a bag B arranged at the pickup position Pt from the guide table 20 and places the bag B on a support base 30 of the bag position adjustment device 13. The bag pickup device 12 shown in FIGS. 1 and 2 has two suction cups 27. Each suction cup 27 can be placed, under the control of a control device 50 (see FIG. 3), in a mode in which each suction cup 27 suctions a side wall portion of a bag B with vacuum and in a mode in which each suction cup 27 terminates the vacuum suction.

The bag position adjustment device 13 includes the support base 30, two position adjustment support devices 31, and a bag detection sensor 32.

The support base 30 supports a bag B from below. The support base 30 of the present embodiment includes: a central support base 30*a*; and a first side support base 30*b* and a second side support base 30*c* between which the central support base 30*a* is arranged in terms of a horizontal direction (see an arrow "A1" in FIG. 1) forming a right angle with the traveling direction A2. Each of the central support base 30*a*, the first side support base 30*b* and the second side support base 30*c* extends in the traveling direction A2. The central support base 30*a* shown in FIGS. 1 and 2 is fixedly provided and does not move in the traveling direction A2.

The two position adjustment support devices 31 are fixed to the first side support base 30*b* and the second side support base 30*c*, respectively. Each position adjustment support device 31 includes an upper position adjustment support 31*a* and a lower position adjustment support 31*b*, and the upper position adjustment support 31*a* and the lower position adjustment support 31*b* are provided so as to be able to grip and release a bag B on the support base 30. In the example shown in FIGS. 1 and 2, the upper position adjustment support 31*a* is provided so as to be swingable with respect to the lower position adjustment support 31*b*. On the other hand, the lower position adjustment support 31*b* does not swing, and the grip surface of the lower position adjustment support 31*b* extends along the horizontal direction. The upper position adjustment support 31*a* swings between a grip position (i.e., a support mode) and an open position (i.e., a release mode); in the grip position, the upper position adjustment support 31*a* is placed, from above, on a part of a side wall portion (in particular, a side edge) of a bag B on the support base 30; and in the open position, the upper position adjustment support 31*a* is separated from the bag B. The swing angle between the grip position and the open position of the upper position adjustment support 31*a* is not limited. From the viewpoint of smoothly placing a bag B on the lower position adjustment support 31*b*, the swing angle is preferably 90 degrees or more, and it is preferable that the upper position adjustment support 31*a* does not cover the bag B from above in the release mode.

The first side support base 30*b* and the second side support base 30*c* are connected to the support drive device 33 and are made to move back and forth in the horizontal direction along the traveling direction A2 by the support drive device 33. The first side support base 30*b* and the second side support base 30*c* shown in FIGS. 1 and 2 are attached to an engagement block 35 via a support bracket 36. The support bracket 36 includes: first support brackets 36*a* which are fixedly attached to the bottoms of the first side support base 30*b* and the second side support base 30*c* respectively; and a second support bracket 36*b* which is fixedly attached to each first support bracket 36*a* and the engagement block 35. The second support bracket 36*b* shown in FIGS. 1 and 2 extends below the central support base 30*a*, the first side support base 30*b* and the second side support base 30*c*. The engagement block 35 is screw-engaged with a support drive rotation shaft 34 extending from the support drive device 33 and moves in the horizontal direction along the traveling direction A2 according to the rotation of the support drive rotation shaft 34.

In this way, the first side support base 30*b* and the associated position adjustment support device 31 which are integrally provided are provided so as to be reciprocally movable along the traveling direction A2. Likewise, the second side support base 30*c* and the associated position adjustment support device 31 which are integrally provided are provided so as to be reciprocally movable along the traveling direction A2.

The bag detection sensor 32 determines the position of a bag B on the support base 30. The bag detection sensor 32 of the present embodiment determines whether or not a bag B is present at a predetermined detection position below the bag detection sensor 32. The bag detection sensor 32 shown in FIGS. 1 and 2 is an optical sensor that uses a detection light (i.e., a laser light) and determines, according to the reflection of the detection light, whether or not a bag B is present at a detection position directly below the bag detection sensor 32. The bag detection sensor 32 may adopt another system. For example, the bag detection sensor 32 may include a light emitting element and a light receiving element; when a detection light from the light emitting element reaches the light receiving element without being blocked by a bag B, it may be determined that a bag B is not present at the detection position; and when the detection light does not reach the light receiving element, it may be determined that a bag B is present at the detection position.

The bag receiving device 15 receives a bag B from the bag position adjustment device 13. In the present embodiment, the bag holding conveyance device 14 carries a bag B, of which the length direction position has been adjusted by the bag position adjustment device 13, from the bag position adjustment device 13, and then gives the bag B to the bag receiving device 15.

The bag holding conveyance device 14 shown in FIGS. 1 and 2 has a chuck device 28 which grips a bag B (in particular, the end part near the top portion B1) placed on the support base 30. The bag receiving device 15 shown in FIGS. 1 and 2 has two gripper devices 37. The gripper devices 37 respectively grip both side portions of a bag B carried and held by the bag holding conveyance device 14. As described above, in the bag receiving device 15 shown in FIGS. 1 and 2, a pair of gripper devices 37 is used as a holding device which holds one bag B. The bag receiving device 15 may have only one holding device or may have two or more holding devices. As an example, the bag receiving device 15 may have a plurality of holding devices (for example, a plurality of pairs of gripper devices 37) provided so as to be arranged at equal intervals in the circumferential direction and to be movable in the circumferential direction.

Figure 3:
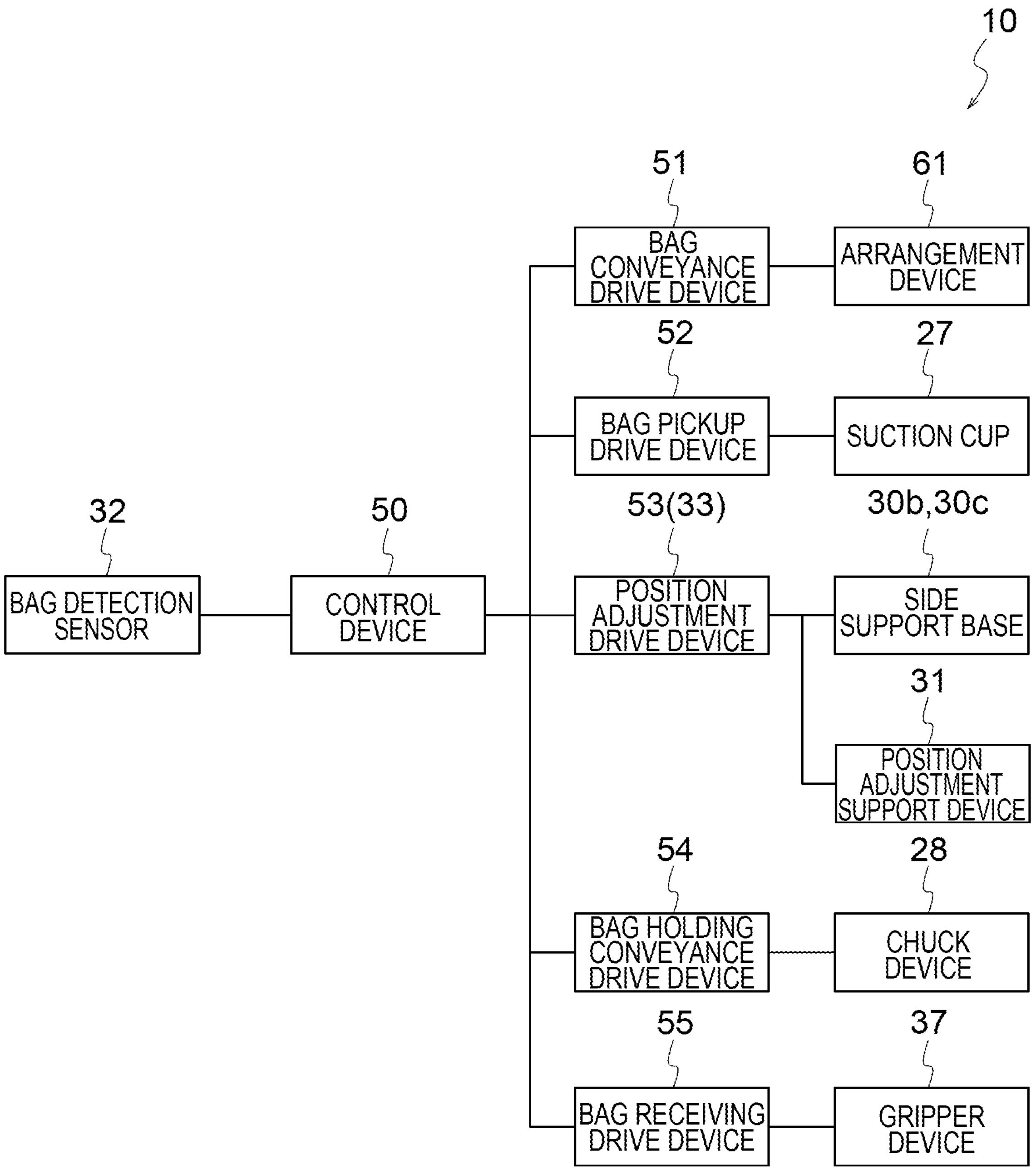
FIG. 3 is a block diagram showing an example of a control configuration of a bag processing system.

FIG. 3 is a block diagram showing an example of the control configuration of the bag processing system 10.

The bag detection sensor 32, a bag conveyance drive device 51, a bag pickup drive device 52, a position adjustment drive device 53, a bag holding conveyance drive device 54 and a bag receiving drive device 55 are connected to the control device 50 included in the bag processing system 10. Devices which are not shown in the drawings may be connected to the control device 50 and may be driven under the control of the control device 50.

The bag detection sensor 32 determines the position of a bag B in the bag position adjustment device 13 (in the example shown in FIGS. 1 and 2, determines whether or not a bag B exists at the detection position directly below the bag detection sensor 32) and sends the detection result to the control device 50.

The bag conveyance drive device 51 is configured by a power device such as a motor (for example, a servomotor) driven under the control of the control device 50 and drives the bag storage device 11. The bag conveyance drive device 51 of the present embodiment applies power to an arrangement device 61 (for example, a moving body or a pushing body) which moves each bag B on the guide table 20 in the traveling direction A2 in such a manner that a bag B to be picked up is located at the pickup position Pt by the arrangement device 61.

The bag pickup drive device 52 is configured by a power device such as a motor (for example, a servomotor) driven under the control of the control device 50 and drives the bag pickup device 12. The bag pickup drive device 52 of the present embodiment applies power to the bag pickup device 12 in such a manner that a bag B from the bag storage device 11 is received by the bag pickup device 12, that the bag B is conveyed from the bag storage device 11 towards the bag position adjustment device 13 by the bag pickup device 12, and that the bag B is delivered to the bag position adjustment device 13 by the bag pickup device 12. The bag pickup drive device 52 of the example shown in FIG. 3 includes: a suction device (not shown), such as a vacuum pump, which is capable of giving to each suction cup 27 a suction force for holding a bag B; and a suction cup movement device (not shown) which moves each suction cup 27.

The position adjustment drive device 53 is configured by a power device such as a motor (for example, a servomotor) driven under the control of the control device 50 and drives the bag position adjustment device 13. The position adjustment drive device 53 of the present embodiment applies power to the bag position adjustment device 13 in such a manner that a bag B from the bag pickup device 12 is received by the bag position adjustment device 13, that the bag B is conveyed in the traveling direction A2 by the bag position adjustment device 13, and that the bag B is delivered to the bag holding conveyance device 14 by the bag position adjustment device 13. The position adjustment drive device 53 of the illustrated example includes: a swing device (not shown) which opens and closes each position adjustment support device 31 (in particular, the upper position adjustment support 31*a*); and a support drive device 33 which causes the first side support base 30*b*, the second side support base 30*c* and two position adjustment support devices 31 to move back and forth in the traveling direction A2. The control device 50 can control the rotational drive of the support drive device 33 while monitoring the state of the support drive device 33 and the support drive rotation shaft 34 (for example, the number of rotations of the support drive rotation shaft 34 from the reference rotation position) so as to locate the first side support base 30*b*, the second side support base 30*c* and each position adjustment support device 31 at desired positions while grasping the positions of the first side support base 30*b*, the second side support base 30*c* and each position adjustment support device 31.

The bag holding conveyance drive device 54 is configured by a power device such as a motor (for example, a servomotor) driven under the control of the control device 50 and drives the bag holding conveyance device 14. The bag holding conveyance drive device 54 of the present embodiment applies power to the bag holding conveyance device 14 in such a manner that a bag B from the bag position adjustment device 13 is received by the bag holding conveyance device 14, that the bag B is conveyed from the bag position adjustment device 13 to the bag receiving device 15 by the bag holding conveyance device 14, and the bag B is delivered to the bag receiving device 15 by the bag holding conveyance device 14. The bag holding conveyance drive device 54 of the illustrated example includes: a chuck opening-closing device (not shown) which opens and closes the chuck device 28 of the bag holding conveyance device 14; and a chuck moving device (not shown) which moves the chuck device 28.

The bag receiving drive device 55 is configured by a power device such as a motor (for example, a servomotor) driven under the control of the control device 50 and drives the bag receiving device 15. The bag receiving drive device 55 of the present embodiment applies power to the bag receiving device 15 in such a manner that a bag B from the bag holding conveyance device 14 is received by the bag receiving device 15 and that the bag receiving device 15 conveys the bag B to a device (for example, a packaging device or a bag-making device) provided in a subsequent stage. The bag receiving drive device 55 of the illustrated example includes: a gripper opening-closing device (not shown) which opens and closes each gripper device 37; and a gripper moving device (not shown) which moves each gripper device 37.

FIGS. 4 to 13 are diagrams for explaining the operation of the bag processing system 10. FIGS. 4 to 7 are plan views and FIGS. 8 to 13 are side views. In FIGS. 4 to 13, the illustration of the support drive device 33, the support drive rotation shaft 34, the engagement block 35 and the support brackets 36 is omitted. Further, in FIGS. 8 to 13, the illustration of the first side guide 21*a* is omitted.

Each step described below is performed by the control device 50 appropriately controlling the bag conveyance drive device 51, the bag pickup drive device 52, the position adjustment drive device 53, the bag holding conveyance drive device 54, the bag receiving drive device 55, and the like.

Figure 4:
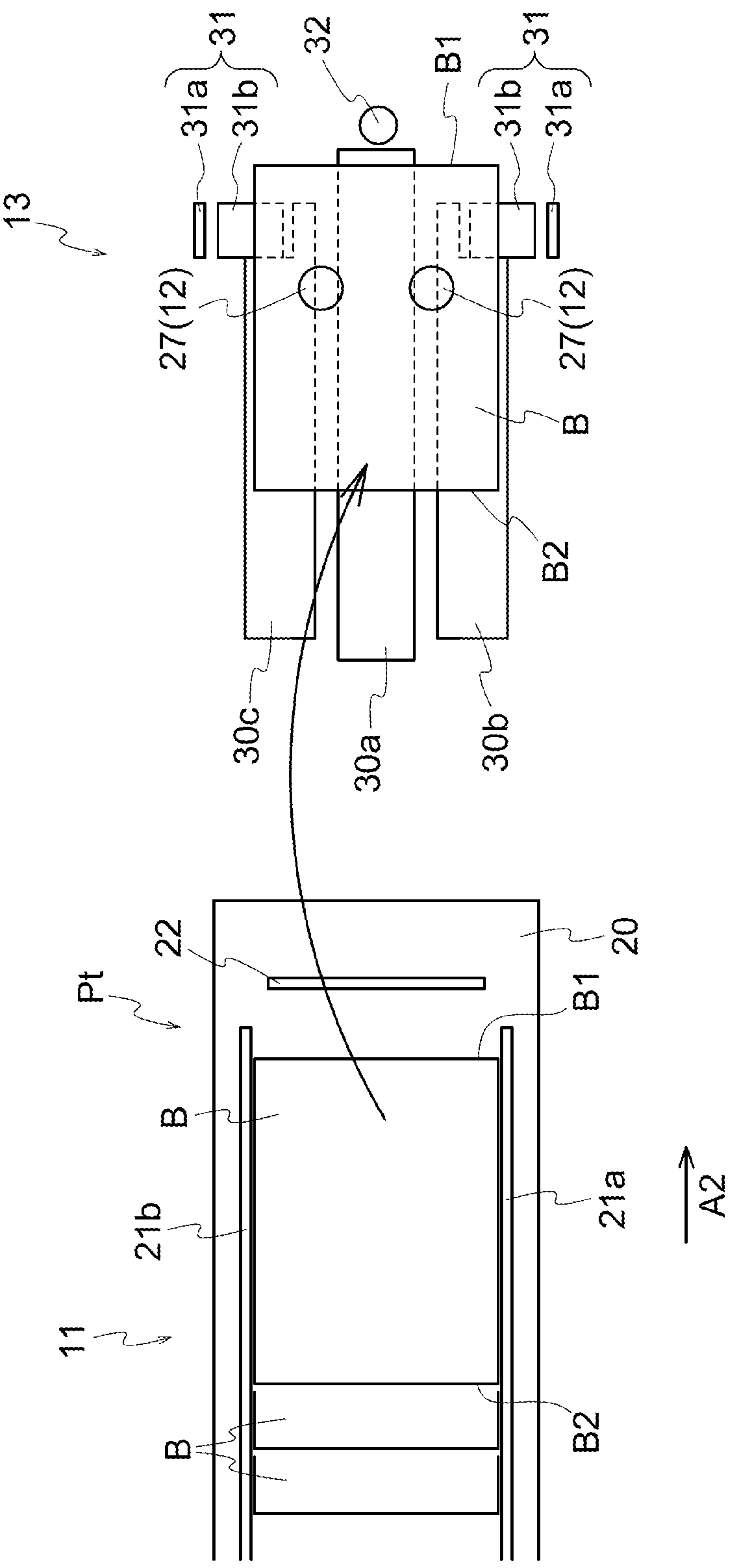
FIG. 4 is a diagram for explaining the operation of a bag processing system.
Figure 8:
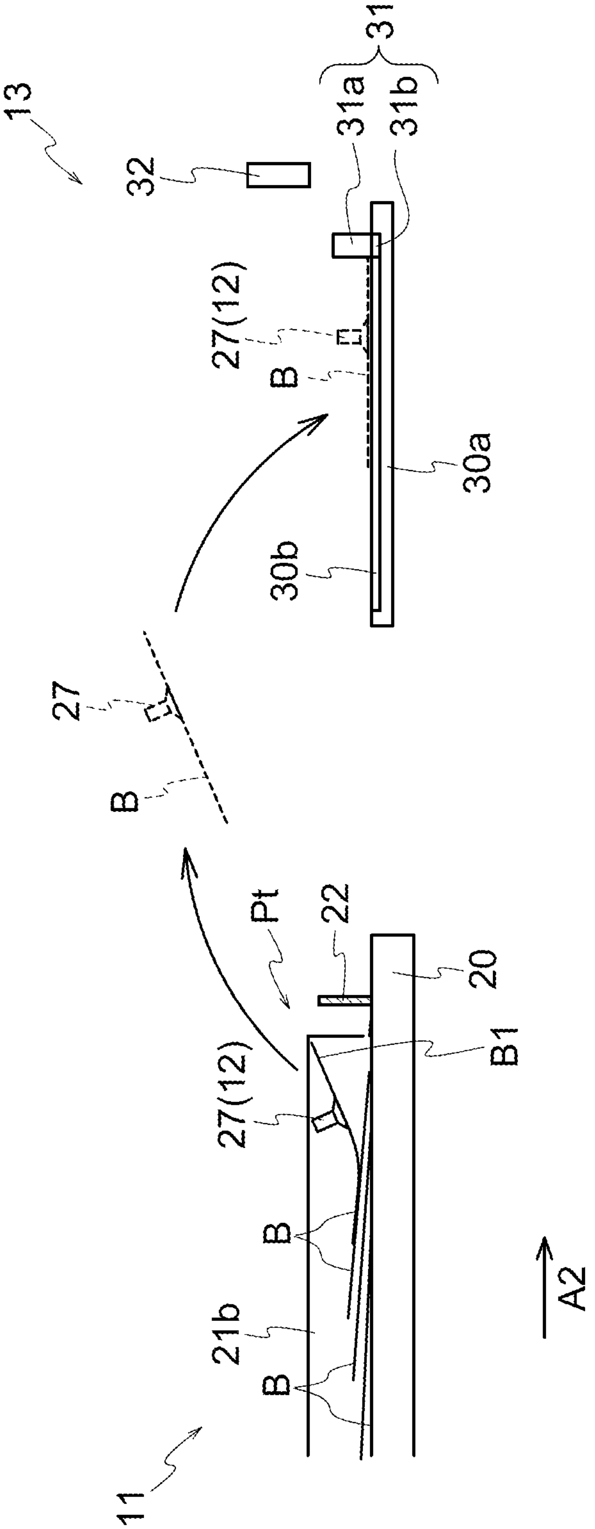
FIG. 8 is a diagram for explaining the operation of a bag processing system.

As shown in FIGS. 4 and 8, a bag B on the guide table 20 arranged at the pickup position Pt is moved onto the support base 30 of the bag position adjustment device 13 by the suction cups 27 of the bag pickup device 12. Specifically, a step of arranging each suction cup 27 on the front side wall portion of a bag B arranged at the pickup position Pt and sucking and holding the front side wall portion of the bag B by each suction cup 27, a step of lifting the bag B from the leading side (i.e., the top portion B1 side) with each suction cup 27 in a state where each suction cup 27 maintains the suction holding of the front side wall portion of the bag B, a step of moving each suction cup 27 together with the bag B from the bag storage device 11 toward the bag position adjustment device 13 in a state where each suction cup 27 maintains the suction holding of the front side wall portion of the bag B, and a step of causing each suction cup 27 to release the suction holding of the front side wall portion of the bag B above the support base 30 of the bag position adjustment device 13 so that the bag B is placed on the support base 30, are performed.

When a bag B is placed on the support base 30, the upper position adjustment support 31*a* of each position adjustment support device 31 is arranged in an open position, and the lower position adjustment support 31*b* is exposed upward. The bag pickup device 12 places the bag B, which is carried from the bag storage device 11, on the central support base 30*a*, the first side support base 30*b*, the second side support base 30*c*, and each lower position adjustment support 31*b*. The position of the bag B handed over to the bag position adjustment device 13 in this way is a position such that the bag B is not present at the detection position directly below the bag detection sensor 32.

Figure 5:
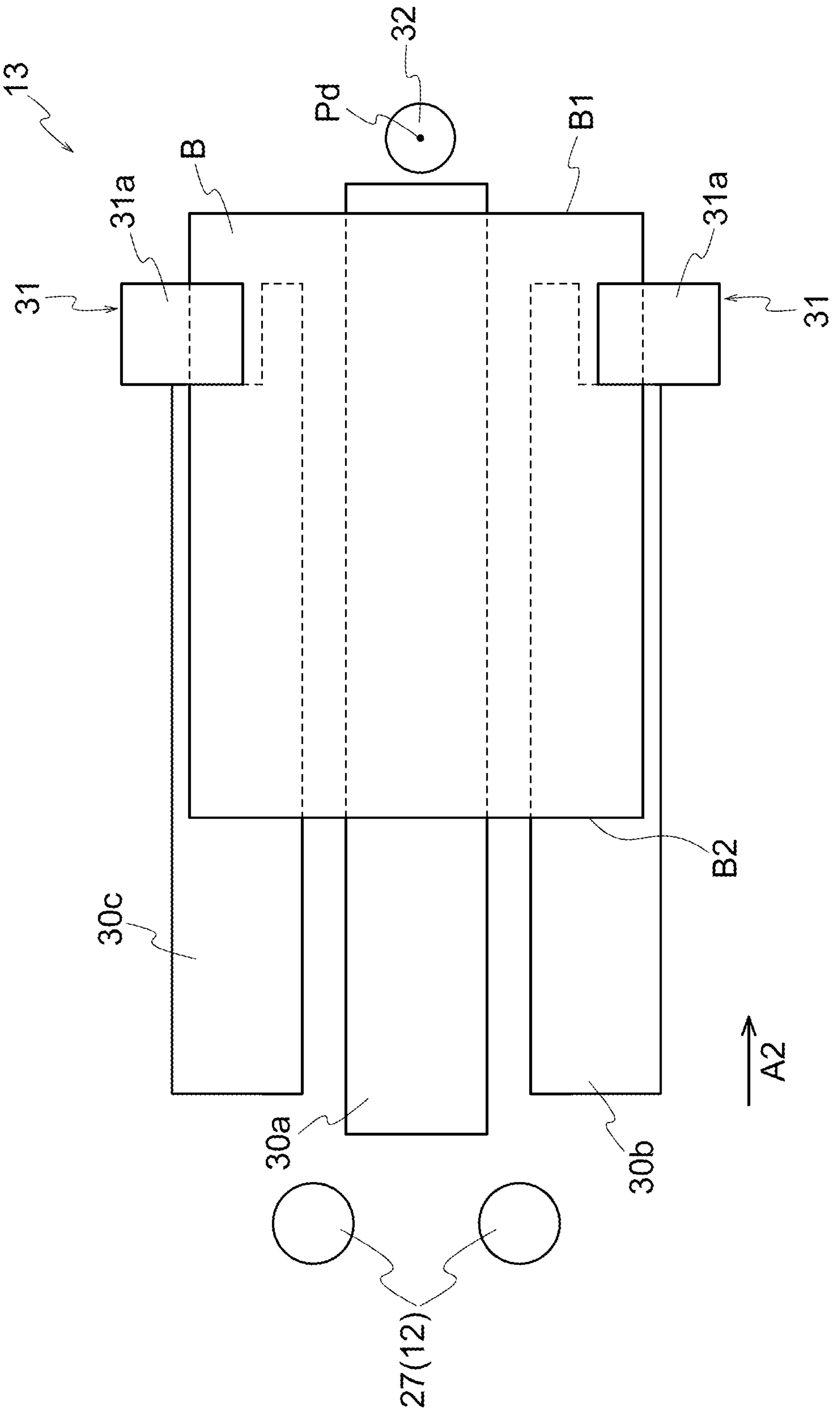
FIG. 5 is a diagram for explaining the operation of a bag processing system.
Figure 9:
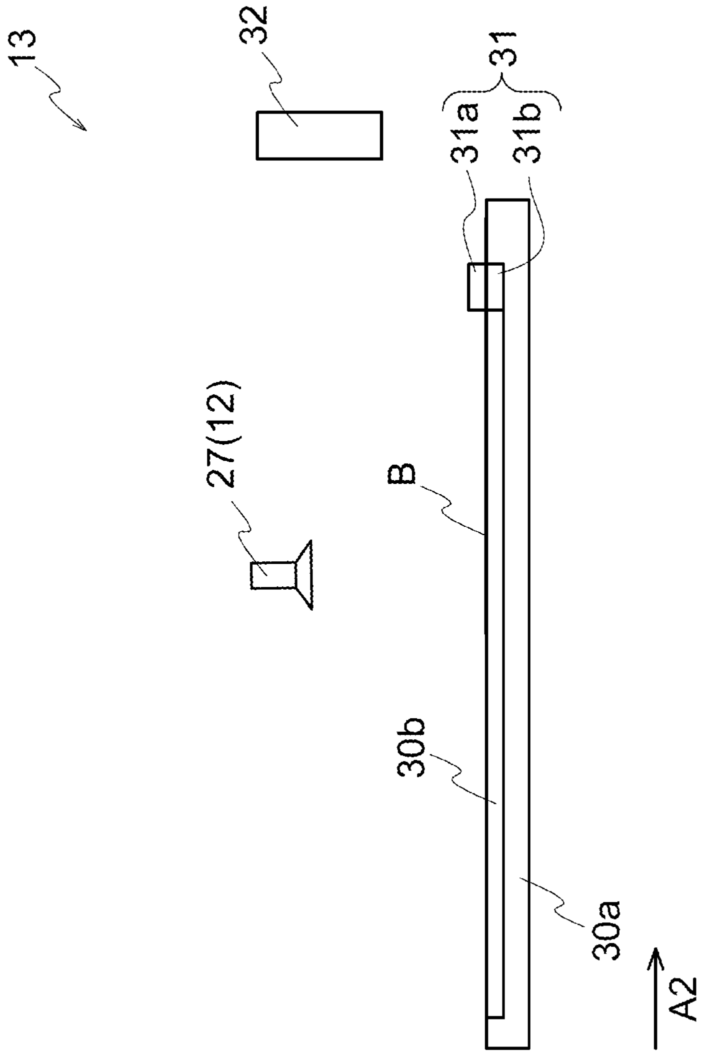
FIG. 9 is a diagram for explaining the operation of a bag processing system.

After a bag B is placed on the support base 30 and each of the lower position adjustment supports 31*b*, each upper position adjustment support 31*a* is arranged at the grip position and the bag B is gripped by the position adjustment support devices 31 in a state of being placed on the support base 30 (see FIGS. 5 and 9). On the other hand, each suction cup 27 of the bag pickup device 12 releases the bag B and moves toward the bag storage device 11 in order to carry a next bag B from the bag storage device 11 to the bag position adjustment device 13. The timing at which each suction cup 27 releases the bag B is not limited. The release of a bag B from each suction cup 27 may be performed before the bag B is mounted on the support base 30 or may be performed after the bag B is mounted on the support base 30. Further, the release of a bag B from each suction cup 27 may be performed before each position adjustment support device 31 grips the bag B or may be performed after each position adjustment support device 31 grips the bag B.

Figure 6:
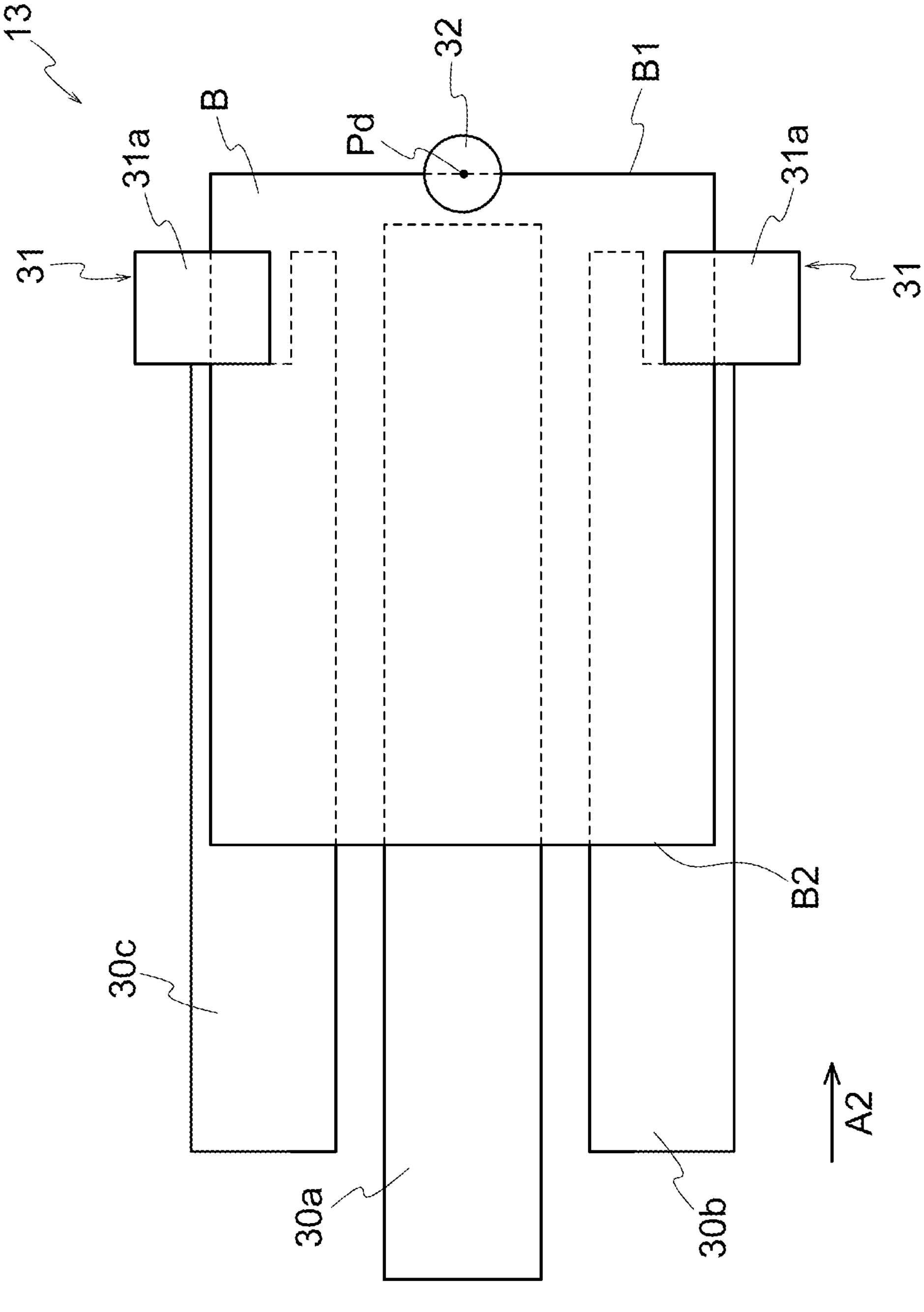
FIG. 6 is a diagram for explaining the operation of a bag processing system.
Figure 10:
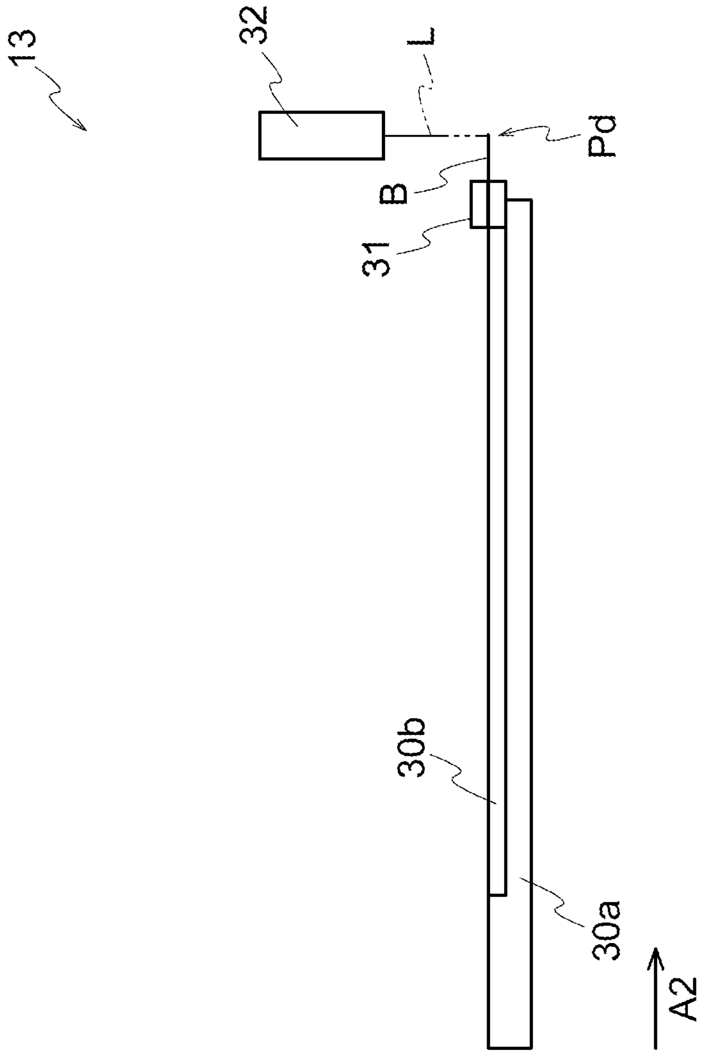
FIG. 10 is a diagram for explaining the operation of a bag processing system.

After being released from the bag pickup device 12, a bag B is moved in the traveling direction A2 while being gripped by each position adjustment support device 31. In the present embodiment, the support drive device 33 is driven under the control of the control device 50 to move the first side support base 30*b*, the second side support base 30*c* and each position adjustment support device 31 in the traveling direction A2 in an integrated manner, so that the bag B gripped by each position adjustment support device 31 moves in the traveling direction A2. The bag B moves in the traveling direction A2 together with the first side support base 30*b*, the second side support base 30*c* and each position adjustment support device 31 while sliding on the stopped central support base 30*a*. During the movement of the bag B in the traveling direction A2, the bag detection sensor 32 determines the arrival and passage of the bag B at the detection position Pd directly below the bag detection sensor 32 and transmits the detection result to the control device 50 (FIGS. 6 and 10).

The control device 50 can acquire the timing when a bag B reaches the detection position Pd, according to the detection signal from the bag detection sensor 32 and uses this timing as the reference timing. The control device 50 adjusts the position of the bag B in the length direction based on this reference timing.

Figure 7:
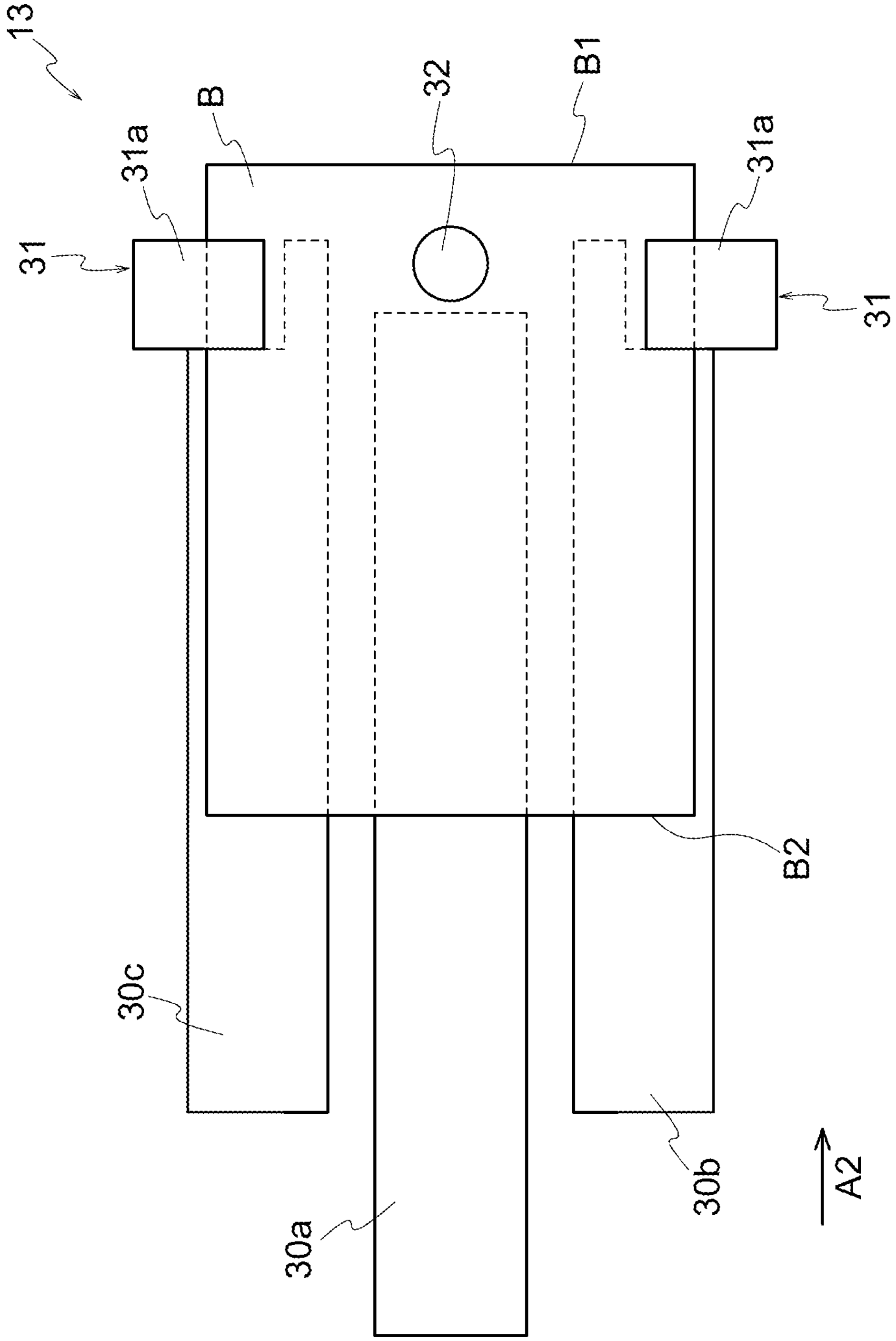
FIG. 7 is a diagram for explaining the operation of a bag processing system.
Figure 11:
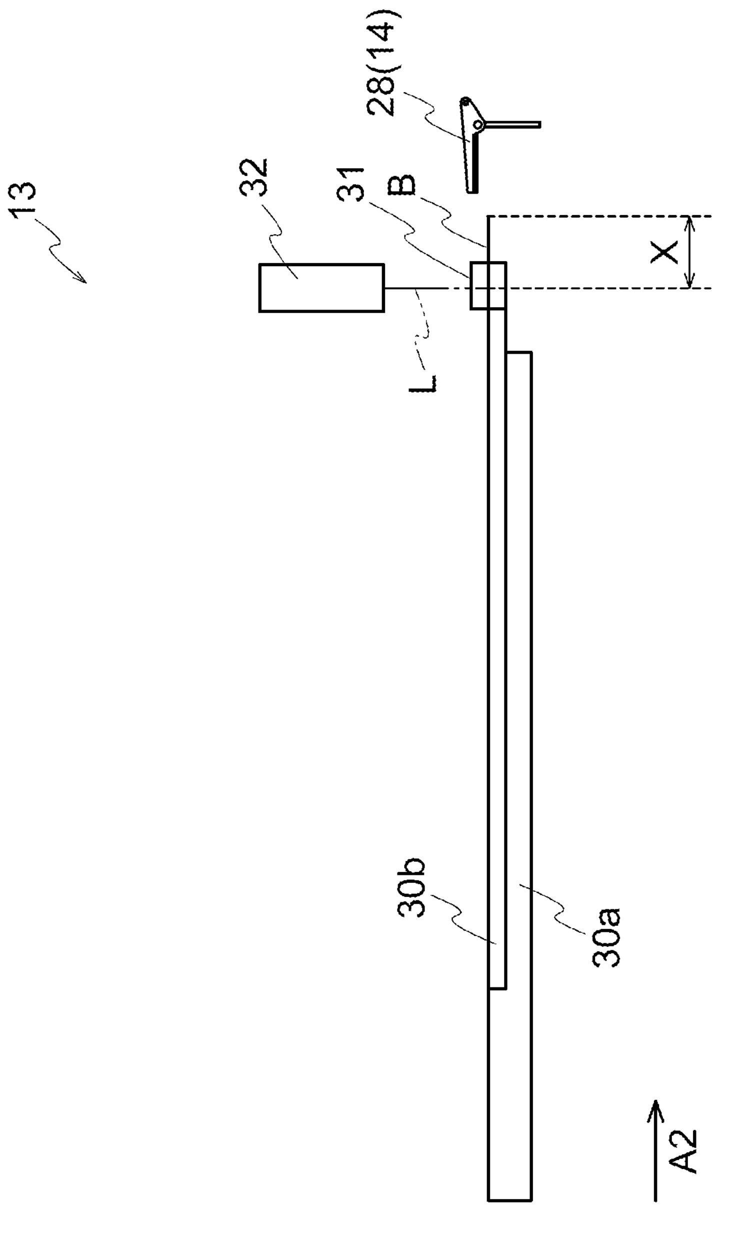
FIG. 11 is a diagram for explaining the operation of a bag processing system.
Figure 12:
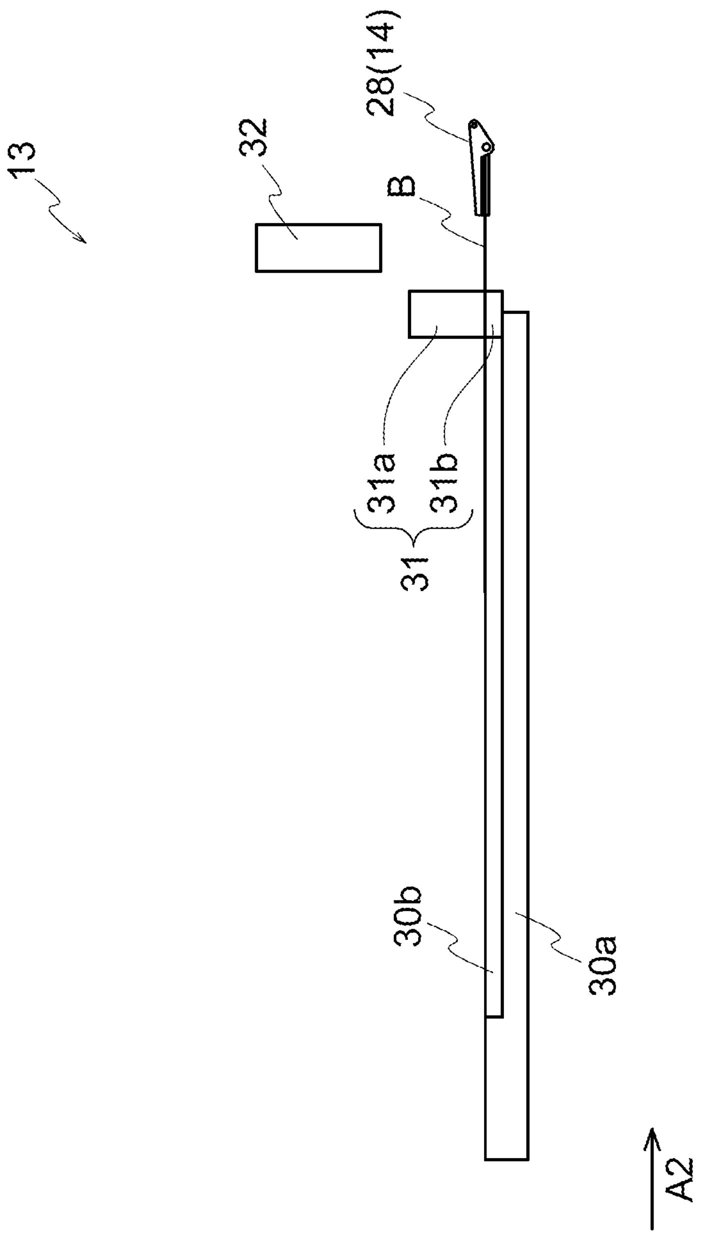
FIG. 12 is a diagram for explaining the operation of a bag processing system.
Figure 13:
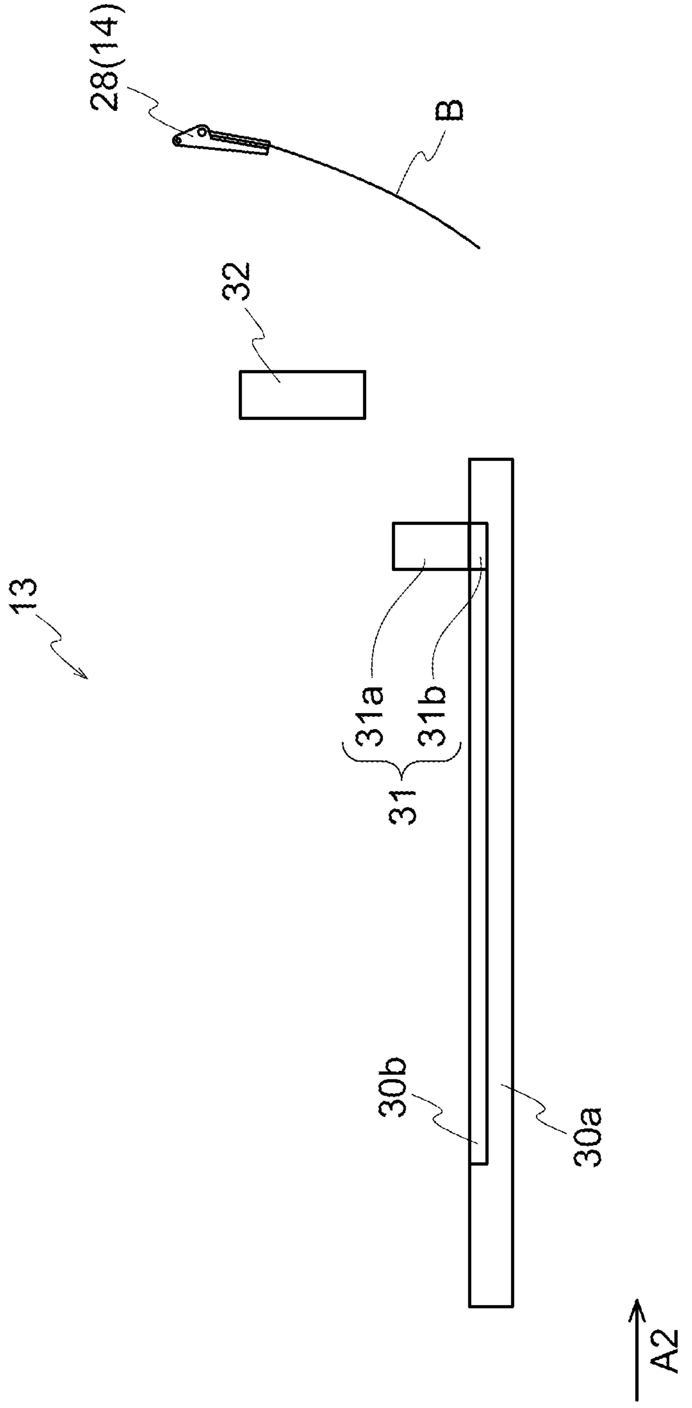
FIG. 13 is a diagram for explaining the operation of a bag processing system.

The control device 50 of the present embodiment controls, via the position adjustment drive device 53 (in particular, the support drive device 33), the movement of the first side support base 30*b*, the second side support base 30*c* and each position adjustment support device 31 in such a manner that the bag B is moved in the traveling direction A2 by a predetermined distance (specifically, an adjustment traveling distance X) from the reference timing (specifically, the timing when the bag B reaches the detection position Pd) (see FIGS. 7 and 11). As a result, the traveling direction side edge of the bag B is moved from the detection position Pd in the traveling direction A2 by the adjustment traveling distance X. The moving distance (i.e., the adjustment traveling distance X) from the reference timing of the bag B is not limited. For example, the adjustment traveling distance X may be substantially zero (0) and the control device 50 may stop the driving of the support drive device 33 to stop the movement of the bag B in the traveling direction A2 at the same time as the bag detection sensor 32 detects the arrival of the bag B at the detection position Pd.

After that, the bag B is delivered from the bag position adjustment device 13 to the bag receiving device 15 via the bag holding conveyance device 14. In the example shown in drawings, the bag B is held by the chuck device 28 of the bag holding conveyance device 14 after being moved from the reference timing by the adjustment traveling distance X, and is subsequently released from being gripped by each position adjustment support device 31 (see FIG. 12). After that, the bag B is moved toward the bag receiving device 15 together with the chuck device 28 (see FIG. 13), is gripped by each gripper device 37 of the bag receiving device 15, and is released from the holding by the chuck device 28. The bag B carried by the chuck device 28 is positioned in a grip location in a state where each gripper device 37 opens, and then each gripper device 37 is closed to grip the bag B.

The timing at which each position adjustment support device 31 releases the grip of a bag B, the timing at which the chuck device 28 of the bag holding conveyance device 14 holds a bag B, the timing at which the chuck device 28 releases the holding of a bag B, and the timing at which each gripper device 37 grips a bag B are not limited. The timing at which each position adjustment support device 31 releases the grip of a bag B may be before or after the chuck device 28 holds the bag B. The timing at which the chuck device 28 releases the holding of a bag B may be after each gripper device 37 grips the bag B.

A bag B delivered to each gripper device 37 in this way is sent to the subsequent stage along with each gripper device 37. On the other hand, in order to receive a next bag B sent from the bag storage device 11, the first side support base 30*b*, the second side support base 30*c* and each position adjustment support device 31 are moved in a direction opposite to the traveling direction A2 and stand by at the original positions (see FIGS. 4 and 8), and each position adjustment support device 31 (specifically, each upper position adjustment support 31*a*) maintains the state of the open position.

As described above, the above-mentioned bag supply method includes the steps of: causing the arrangement device 61 to arrange a bag B at the pickup position Pt; delivering the bag B from the pickup position Pt to the support device (i.e., the support base 30 and each position adjustment support device 31) via the bag pickup device 12; moving the bag B along with the support device (i.e., the first side support base 30*b*, the second side support base 30*c* and each position adjustment support device 31) in the traveling direction A2 along a movement path including the detection position Pd; determining arrival of the bag Bat the detection position Pd; stopping the bag B along with the support device (i.e., the first side support base 30*b*, the second side support base 30*c* and each position adjustment support device 31) on the movement path according to a timing when the bag B arrives at the detection position Pd; and delivering the bag B stopped in the movement path, from the support device (i.e., the support base 30 and each position adjustment support device 31) to the bag receiving device 15 via the bag holding conveyance device 14.

Further, the above-mentioned bag supply apparatus (i.e., the bag processing system 10) comprises: the arrangement device 61 which arranges a bag B at the pickup position Pt; the bag position adjustment device 13 having the support device (i.e., the support base 30 and each position adjustment support device 31); the bag pickup device 12 which moves the bag B from the pickup position Pt and delivers the bag B to the support device (i.e., the support base 30 and each position adjustment support device 31); the bag detection sensor 32 which determines the arrival of the bag B at the detection position Pd; the bag receiving device 15; and the bag holding conveyance device 14 which receives the bag B from the support device (i.e., the support base 30 and each position adjustment support device 31) and delivers the bag B to the bag receiving device 15. The support device (i.e., the first side support base 30*b*, the second side support base 30*c* and each position adjustment support device 31) moves the bag B in the traveling direction A2 along the movement path including the detection position Pd and stops the bag B according to the "timing when the bag B reaches the detection position Pd" obtained from the detection result of the bag detection sensor 32. The bag holding conveyance device 14 carries the bag B stopped in the movement path, from the support device (i.e., the support base 30 and each position adjustment support device 31) to the bag receiving device 15.

According to these bag supply method and bag supply apparatus, the misalignment of a bag B in the length direction (that is, the traveling direction A2) can be corrected and the bag B after the misalignment correction can be given to the bag receiving device 15.

Further, the bag processing system 10 comprises the bag storage device 11 which holds a plurality of bags B. The arrangement device 61 arranges a plurality of bags B held by the bag storage device 11 one by one at the pickup position Pt.

As a result, the misalignment can be continuously corrected for the plurality of bags B, and the plurality of bags B after receiving the correction of the misalignment can be continuously given to the bag receiving device 15.

Further, in the step of delivering a bag B from the pickup position Pt to the support device (i.e., the support base 30 and each position adjustment support device 31), the bag pickup device 12 holds the bag B arranged at the pickup position Pt by vacuum suction, and the bag pickup device 12 is moved along with the bag B in a state where the bag pickup device 12 holds the bag B by vacuum suction in such a manner that the bag B is moved from the pickup position Pt. The bag pickup device 12 reciprocates between the pickup position Pt (the bag storage device 11) and the bag position adjustment device 13, holds a bag B arranged at the pickup position Pt by vacuum suction, and moves while holding the bag B by vacuum suction to move the bag B from the pickup position Pt.

Thus, a bag B can be appropriately moved from the pickup position Pt and the bag B can be appropriately passed to the support device (i.e., the support base 30 and each position adjustment support device 31).

Further, in the step of delivering a bag B from the pickup position Pt to the support device (i.e., the support base 30 and each position adjustment support device 31), the support device (i.e., the support base 30 and each position adjustment support device 31) holds both side edges of the bag B and supports the bag B from below, and the bag pickup device 12 releases the holding of the bag B.

Thus, a bag B is appropriately delivered from the bag pickup device 12 to the support device (i.e., the support base 30 and each position adjustment support device 31) and is appropriately supported by the support device (i.e., the support base 30 and each position adjustment support device 31).

Further, in the step of moving a bag B in the traveling direction A2 along with the support device (i.e., the first side support base 30*b*, the second side support base 30*c* and each position adjustment support device 31), the support device (i.e., each position adjustment support device 31) moves in the traveling direction A2 while holding both side edges of the bag B.

Thus, a bag B can be appropriately moved in the traveling direction A2.

Further, the support device includes: a side edge support device (i.e., the two position adjustment support devices 31) which holds both side edges of a bag B; and a lower support device (i.e., the support base 30) which supports the bag B from below. The side edge support device (i.e., the two position adjustment support devices 31) is driven based on a hold mode for holding a bag B and a release mode for releasing a bag B.

Thus, a bag B is appropriately held and released by the support device.

Further, in the step of delivering a bag B from the support device (i.e., the support base 30 and each position adjustment support device 31) to the bag receiving device 15, the bag holding conveyance device 14 holds a bag B being supported by the support device (i.e., the support base 30 and each position adjustment support device 31) and is moved together with the bag B while holding the bag B, and the bag B is released from the holding by the support device (the support base 30 and each position adjustment support device 31).

Thus, a bag B can be appropriately delivered from the support device (i.e., the support base 30 and each position adjustment support device 31) to the bag receiving device 15.

Further, the bag holding conveyance device 14 holds one end of a bag B with respect to the traveling direction A2 and the bag receiving device 15 holds both side edges of a bag B.

Thus, a bag B can be smoothly passed from the bag holding conveyance device 14 to the bag receiving device 15.

As described above, in the bag processing system 10, both side edges of a bag B, such as an empty bag, are sandwiched by a pair of left and right positioning holding members (i.e., the position adjustment support devices 31), and the pair of left and right positioning holding members is moved in the direction in which the both side edges of the bag B extend (that is, in the traveling direction A2). Thus, a bag B does not bend when the bag B is positioned, and further misalignment of a bag B in the length direction (i.e., the traveling direction A2) can be reliably corrected.

[First Variant]

Figure 19:
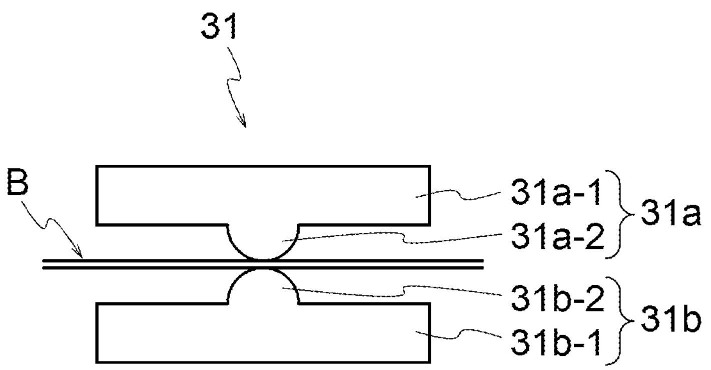
FIG. 19 is a schematic cross-sectional view illustrating a position adjustment support device as an example.
Figure 20:
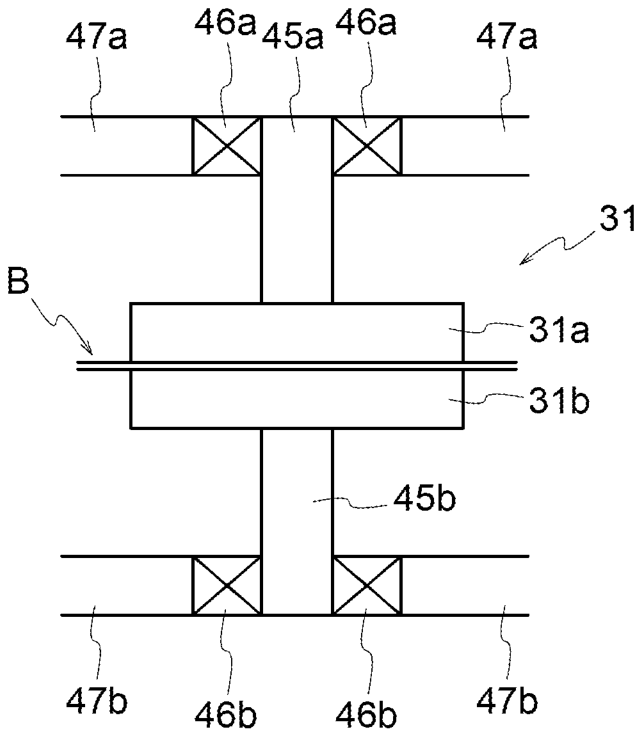
FIG. 20 is a schematic cross-sectional view illustrating a position adjustment support device as an example.

FIGS. 14 to 18 are plan views for explaining the operation of the bag position adjustment device 13 according to a first variant. FIGS. 19 and 20 are schematic cross-sectional views illustrating the position adjustment support device 31 as an example.

The bag processing system 10 (in particular, the bag position adjustment device 13) according to the present variant can correct the misalignment of a bag B in the length direction and the misalignment of a bag B in the rotation direction.

In the present variant, the drive mechanism which moves the first side support base 30*b* and the associated position adjustment support device 31 is provided separately from the drive mechanism which moves the second side support base 30*c* and the associated position adjustment support device 31. In the examples shown in FIGS. 14 to 18, the first side support base 30*b* and the associated position adjustment support device 31 are equipped with a first support drive device 33*a*, a first support drive rotation shaft 34*a*, a first engagement block 35*a* and a first support bracket 36*a*. On the other hand, the second side support base 30*c* and the associated position adjustment support device 31 are equipped with a second support drive device 33*b*, a second support drive rotation shaft 34*b*, a second engagement block 35*b* and a second support bracket 36*b*.

The first support bracket 36*a* is fixedly attached to the first side support base 30*b* (for example, to the side surface) and is attached to the first support drive rotation shaft 34*a* via the first engagement block 35*a*. When the first support drive device 33*a* rotates the first support drive rotation shaft 34*a* under the control of the control device 50, the first engagement block 35*a* being screw-engaged with the first support drive rotation shaft 34*a* moves back and forth along the first support drive rotation shaft 34*a* extending in the traveling direction A2. The first side support base 30*b* and the associated position adjustment support device 31, attached to the first engagement block 35*a* via the first support bracket 36*a*, move back and forth in the traveling direction A2 along with the first engagement block 35*a*.

Likewise, the second support bracket 36*b* is fixedly attached to the second side support base 30*c* and is attached to the second support drive rotation shaft 34*b* via the second engagement block 35*b*. When the second support drive device 33*b* rotates the second support drive rotation shaft 34*b* under the control of the control device 50, the second engagement block 35*b* being screw-engaged with the second support drive rotation shaft 34*b* moves back and forth along the second support drive rotation shaft 34*b* extending in the traveling direction A2, and the second side support base 30*c* and the associated position adjustment support device 31 move back and forth in the traveling direction A2 along with the second engagement block 35*b*.

The bag position adjustment device 13 of the present variant has a first bag detection sensor 32*a* and a second bag detection sensor 32*b*. The first bag detection sensor 32*a* is a sensor for determining one side edge part of a bag B (see the lower side edge part in FIG. 14). The first bag detection sensor 32*a* shown in drawings determines whether or not a bag B exists at a predetermined first detection position Pd1 below the first bag detection sensor 32*a*. The second bag detection sensor 32*b* is a sensor for determining the other side edge part of a bag B (see the upper side edge part in FIG. 14). The second bag detection sensor 32*b* shown in drawings determines whether or not a bag B exists at a predetermined second detection position Pd2 below the second bag detection sensor 32*b*.

The first detection position Pd1 and the second detection position Pd2 (in particular, the relative position between the first detection position Pd1 and the second detection position Pd2) are determined depending on the shape (in particular, the end shape on the traveling direction side) of a bag B to be detected. In the present variant, the first detection position Pd1 and the second detection position Pd2 are set in such a manner that, when a bag B is arranged on the support base 30 without misalignment, the bag B simultaneously reaches the first detection position Pd1 and the second detection position Pd2. The first detection position Pd1 and the second detection position Pd2 shown in drawings are the same positions with respect to the traveling direction A2 (see the left-right direction in FIG. 14) and are away from each other with respect to the horizontal direction perpendicular to the traveling direction A2 (see the vertical direction in FIG. 14).

Figure 14:
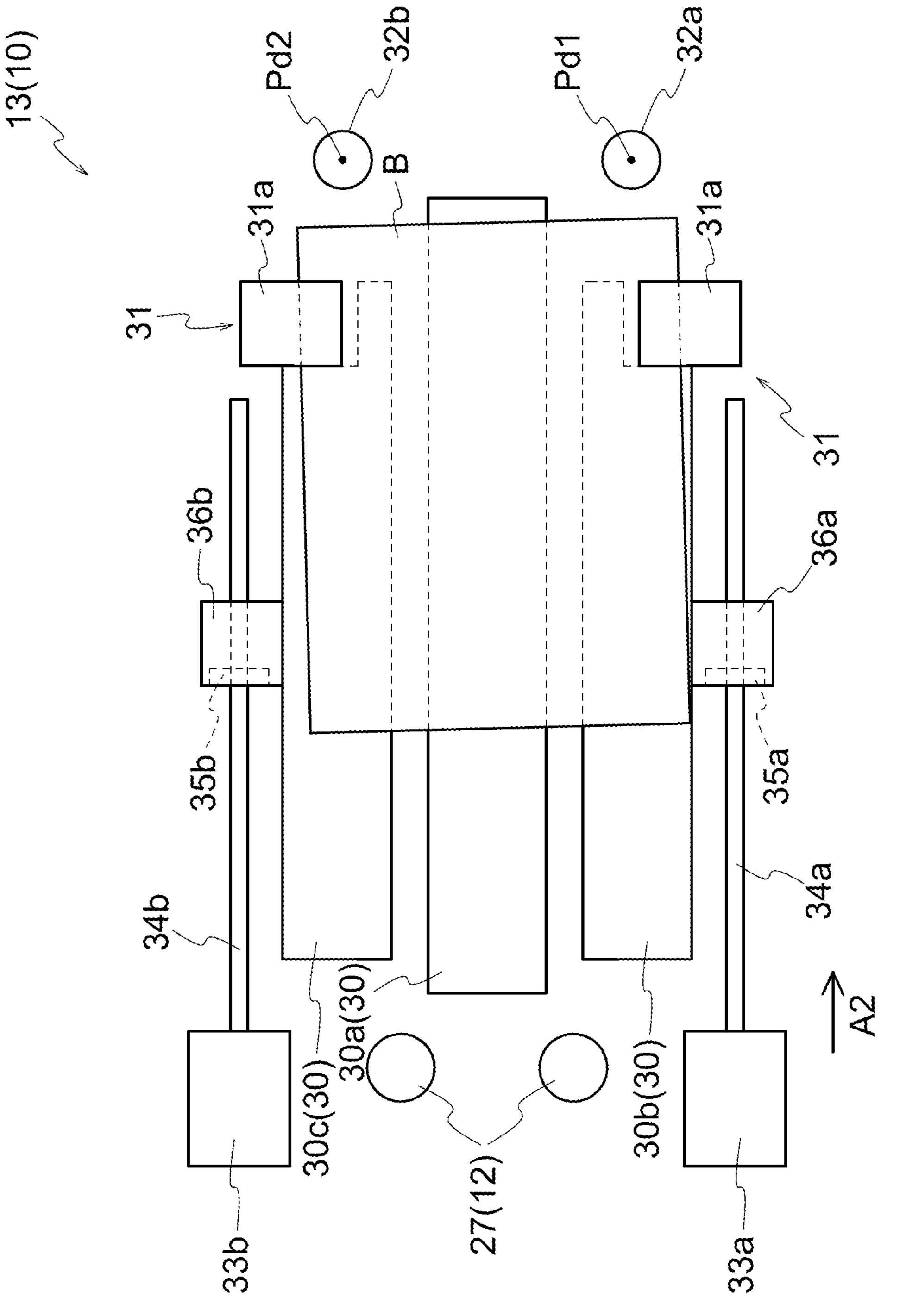
FIG. 14 is a plan view for explaining the operation of a bag position adjustment device according to a first variant.
Figure 15:
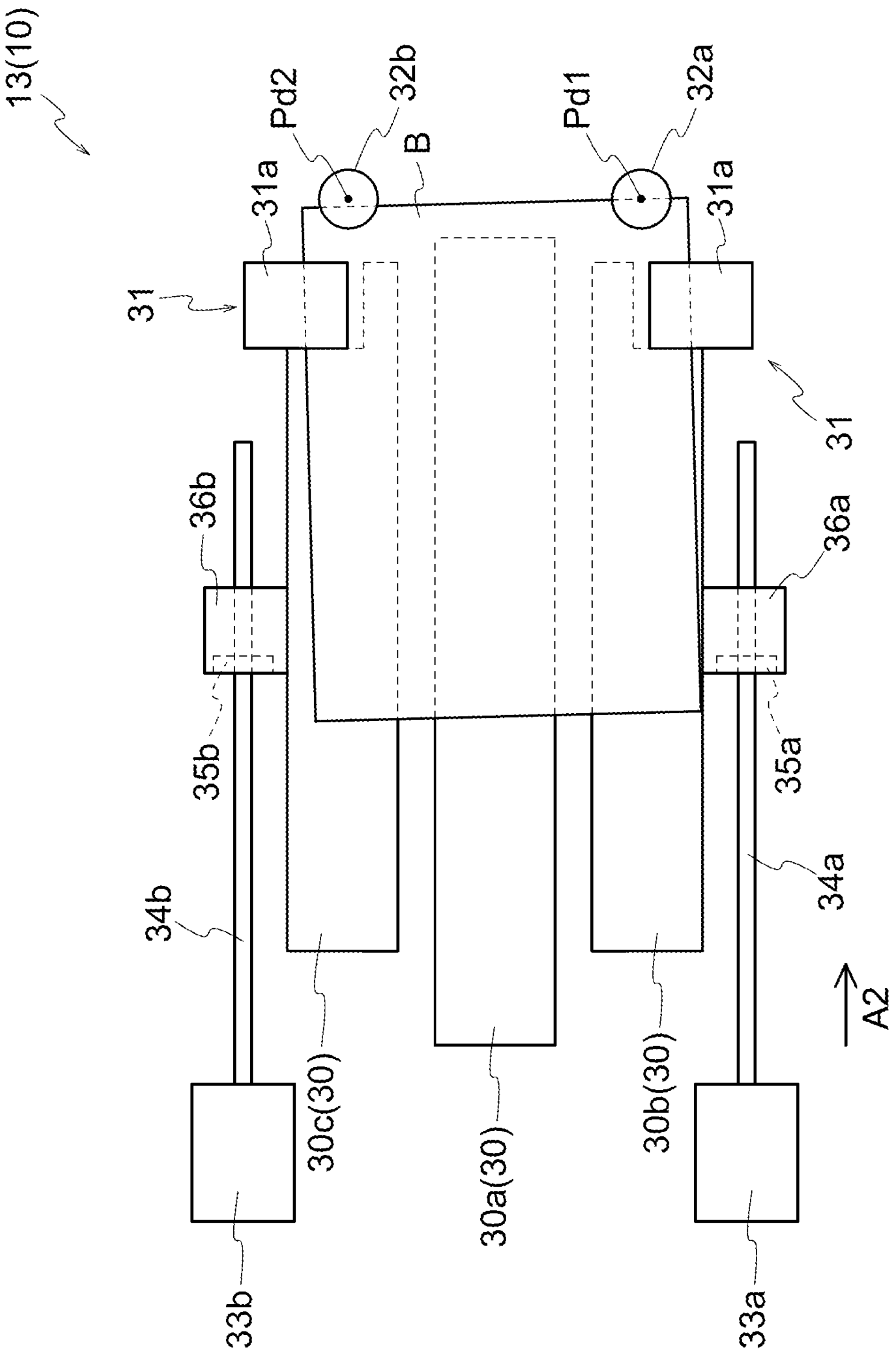
FIG. 15 is a plan view for explaining the operation of a bag position adjustment device according to the first variant.
Figure 16:
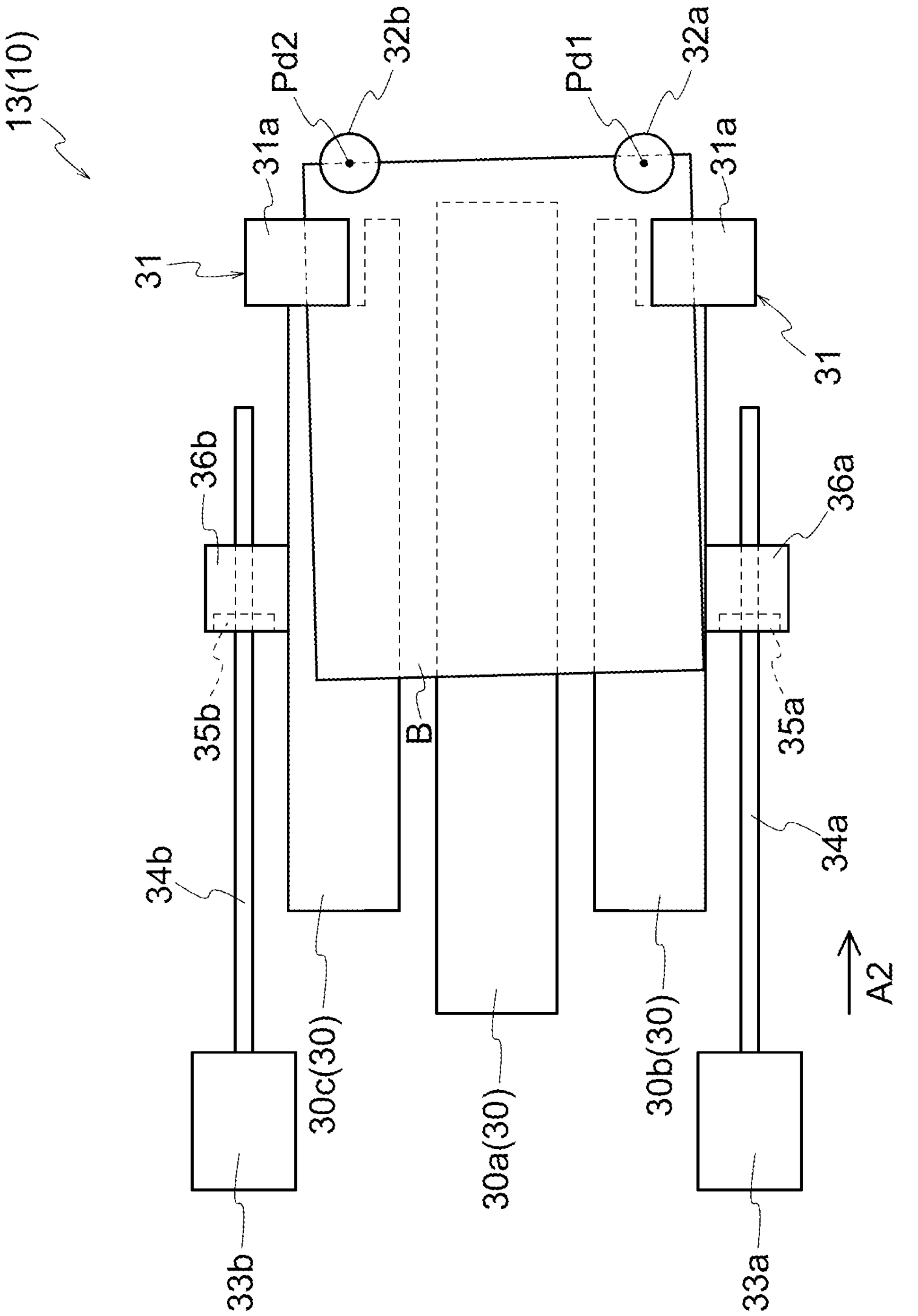
FIG. 16 is a plan view for explaining the operation of a bag position adjustment device according to the first variant.

In the present variant, as in the above-described embodiment (see FIGS. 4 to 13), the suction cups 27 of the bag pickup device 12 move a bag B from the bag storage device 11 and place the bag B on the support base 30 (i.e., the central support base 30*a*, the first side support base 30*b* and the second side support base 30*c*) and each position adjustment support device 31 (in particular, each lower position adjustment support 31*b*) (see FIG. 14). Then, the respective position adjustment support devices 31 (in particular, the respective upper position adjustment supports 31*a*) are arranged from the open position to the grip position, so that both side edges of the bag B are gripped.

After that, the first support drive device 33*a* and the second support drive device 33*b* rotate the first support drive rotation shaft 34*a* and the second support drive rotation shaft 34*b* under the control of the control device 50 to move the bag B along with the first side support base 30*b*, the second side support base 30*c* and each position adjustment support device 31. If the bag B is deviated in the rotation direction, the bag B first reaches only one of the first detection position Pd1 and the second detection position Pd2 (see the first detection position Pd1 shown in FIG. 15), and after that, the bag B reaches the other (see the second detection position Pd2 in the example shown in FIG. 16).

Figure 17:
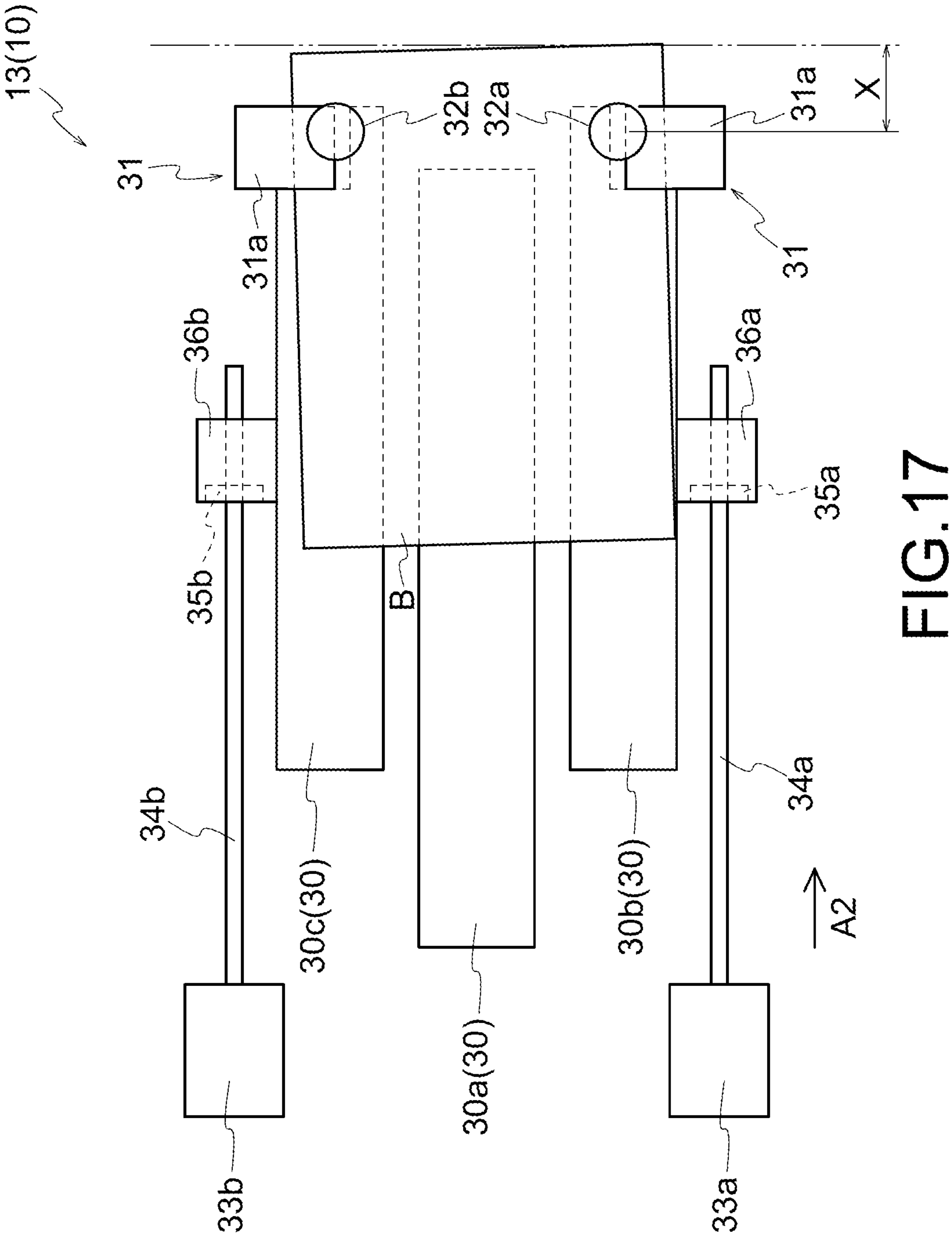
FIG. 17 is a plan view for explaining the operation of a bag position adjustment device according to the first variant.
Figure 18:
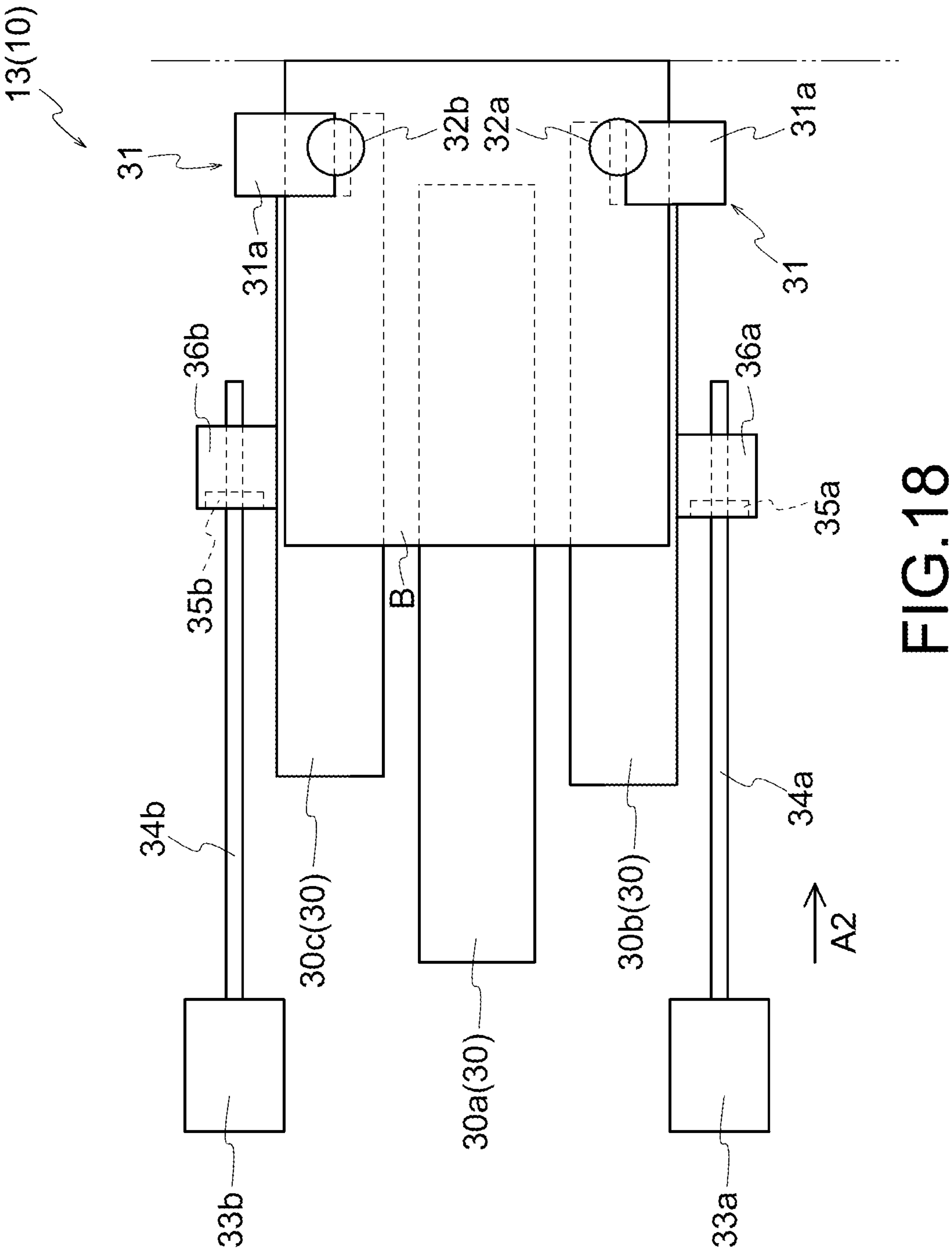
FIG. 18 is a plan view for explaining the operation of a bag position adjustment device according to the first variant.

The first support drive device 33*a* moves the bag B, under the control of the control device 50, in the traveling direction A2 by a predetermined distance (i.e., the adjustment traveling distance X) from the timing (i.e., the first reference timing) when the bag B reaches the first detection position Pd1 (see FIG. 17). On the other hand, the second support drive device 33*b* moves the bag B, under the control of the control device 50, in the traveling direction A2 by the predetermined distance (i.e., the above-mentioned adjustment traveling distance X) from the timing (i.e., the second reference timing) when the bag B reaches the second detection position Pd2 (see FIG. 18). As a result, the misalignment of the bag B is eliminated, and the traveling direction side edge of the bag B is located at a position separated from the reference positions (that is, the first detection position Pd1 and the second detection position Pd2) in the traveling direction A2 by the adjustment traveling distance X.

After that, as in the above-described embodiment (see FIGS. 12 and 13), the bag B is delivered from the bag position adjustment device 13 to the bag receiving device 15 via the bag holding conveyance device 14. Specifically, the bag B is held by the chuck device 28, is released from each position adjustment support device 31, is moved toward the bag receiving device 15 along with the chuck device 28, is gripped by each gripper device 37, and is released from the chuck device 28.

Each position adjustment support device 31 has an arbitrary configuration which can allow a bag B to rotate while gripping the bag B when the misalignment in the rotation direction of the bag B is eliminated as described above, so that the bag B is prevented from receiving an excessive load and the occurrence of wrinkles, or the like, on the bag B is prevented. For example, the position adjustment support device 31 may have a configuration (see FIG. 19 described later) in which the position adjustment support device 31 holds a bag B slidably (in particular, slidably in the rotational direction) or may have a configuration (see FIG. 20 described later) in which the position adjustment support device 31 is capable of rotating along with a bag B while gripping the bag B.

Each position adjustment support device 31 may have a point contact type support configuration in which each position adjustment support device 31 comes into contact with only one place of a bag B when holding the bag B and can grip the bag B so as to allow the bag B to rotate around the contact place. In the example shown in FIG. 19, the upper position adjustment support 31*a* includes an upper support main body portion 31*a*-1 and an upper support protrusion portion 31*a*-2 which protrudes downward from the upper support main body portion 31*a*-1 toward the lower position adjustment support 31*b*. The lower position adjustment support 31*b* includes a lower support main body portion 31*b*-1 and a lower support protrusion portion 31*b*-2 projecting upward from the lower support main body portion 31*b*-1 toward the upper position adjustment support 31*a*. When a bag B is supported by the position adjustment support device 31 shown in FIG. 19, the bag B is sandwiched between the upper support protrusion portion 31*a*-2 and the lower support protrusion portion 31*b*-2, and the upper support protrusion portion 31*a*-2 and the lower support protrusion portion 31*b*-2 face and exert a force on each other via the bag B.

The specific shape of each of the upper support protrusion portion 31*a*-2 and the lower support protrusion portion 31*b*-2 is not limited but is typically has a spherical-like surface. In this case, a bag B is gripped by the spherical surface of the upward support protrusion portion 31*a*-2 and the spherical surface of the downward support protrusion portion 31*b*-2 in such a manner that the position adjustment support device 31 can grip the bag B while allowing the bag B to rotate. The upper support protrusion portion 31*a*-2 and/or the lower support protrusion portion 31*b*-2 may have a curved surface other than a spherical surface. Further, the upper support protrusion portion 31*a*-2 and/or the lower support protrusion portion 31*b*-2 may have a flat surface. For example, although not shown in the drawings, the grip surface of one of the upper position adjustment support 31*a* and the lower position adjustment support 31*b* may be a flat surface while the grip surface of the other is a curved surface.

In a case where each position adjustment support device 31 has a point contact type support configuration as described above, it is preferable that the contact area of the position adjustment support device 31 with respect to a bag B is smaller, from the viewpoint of reducing the resistance of the position adjustment support device 31 with respect to the rotation of the bag B. Specifically, in a state where the position adjustment support device 31 is holding a bag B, the smaller the area of the contact point of the position adjustment support device 31 with the bag B, the smaller the force which can rotate the bag B.

Further, each position adjustment support device 31 may be configured to be rotatable itself along with a bag B supported by each position adjustment support device 31. For example, the upper position adjustment support 31*a* shown in FIG. 20 is fixedly attached to one end side of an upper adjustment support rotation shaft 45*a*. The other end side of the upper adjustment support rotation shaft 45*a* is rotatably supported by an upper rotation support 47*a* via an upper adjustment support bearing 46*a*. Likewise, the lower position adjustment support 31*b* is rotatably supported by a lower rotation support 47*b* via a lower adjustment support rotation shaft 45*b* and a lower adjustment support bearing 46*b*. The upper rotation support 47*a* and the lower rotation support 47*b* are each fixedly attached to the associated side support bases (i.e., the first side support base 30*b* or second side support base 30*c*). An air gap is provided between each of the upper position adjustment support 31*a* and the lower position adjustment support 31*b* and the associated side support base in such a manner that the rotational movement of each of the upper position adjustment support 31*a* and the lower position adjustment support 31*b* is not disturbed by the associated side support base (i.e., the first side support base 30*b* or the second side support base 30*c*).

The upper position adjustment support 31*a* is provided so as to be swingable between the grip position and the open position along with the upper adjustment support rotation shaft 45*a*, the upper adjustment support bearing 46*a* and the upper rotation support 47*a*. As described above, the upper position adjustment support 31*a* and the lower position adjustment support 31*b* shown in FIG. 20 allow a bag B to rotate while gripping the bag B.

As described above, the support device of the present variant includes: the first side edge support device (i.e., the position adjustment support device 31 associated with the first side support base 30*b*) which holds one side edge of a bag B; the second side edge support device (i.e., the position adjustment support device 31 associated with the second side support base 30*c*) which holds the other side edge of the bag B; the first support drive device (i.e., the first support drive device 33*a*, the first support drive rotation shaft 34*a*, the first engagement block 35*a* and the first support bracket 36*a*) which causes the first side edge support device to move back and forth in the traveling direction A2; and the second support drive device (the second support drive device 33*b*, the second support drive rotation shaft 34*b*, the second engagement block 35*b*, and the second support bracket 36*b*) which causes the second side edge support device to move back and forth in the traveling direction A2.

Each of the first side edge support device (i.e., the position adjustment support device 31 associated with the first side support base 30*b*) and the second side edge support device (i.e., the position adjustment support device 31 associated with the second side support base 30*c*) is driven based on the hold mode in which a bag B is held and the release mode in which a bag B is released. In the hold mode, each of the first side edge support device and the second side edge support device holds a bag B so as to allow the rotation of the bag B.

When each of the first side edge support device (the position adjustment support device 31 associated with the first side support base 30*b*) and the second side edge support device (the position adjustment support device 31 associated with the second side support base 30*c*) pinches and holds a bag B so as to come into contact with only one place of the bag B, the bag can be held so as to allow the rotation of the bag B around the contact place (see FIG. 19). Further, when each of the first side edge support device (the position adjustment support device 31 associated with the first side support base 30*b*) and the second side edge support device (the position adjustment support device 31 associated with the second side support base 30*c*) is provided in such a manner that at least part of each of them itself can rotate freely, the bag can be held so as to allow the rotation of the bag B (see FIG. 20).

[Other Variants]

The central support base 30*a* does not move in the traveling direction A2 in the above-described embodiment but may move in the traveling direction A2. In a case where the central support base 30*a* moves in the traveling direction A2, the central support base 30*a* has a shape such that the central support base 30*a* does not pass through the detection position Pd of the bag detection sensor 32. For example, the central support base 30*a* may have a notch portion (i.e., a space portion; not shown in the drawings) formed by cutting out a part of the leading end portion in the traveling direction A2 thereof and the notch portion may pass through the detection position Pd. Further, the position of the leading end portion of the central support base 30*a* in the traveling direction A2 may be adjusted in such a manner that the central support base 30*a* is moved within an extent such that the central support base 30*a* does not reach the detection position Pd by the bag detection sensor 32.

The above-mentioned detection position Pd may be positioned so as to overlap the space between the central support base 30*a* and the first side support base 30*b* or the second side support base 30*c* in the height direction (that is, the direction in the vertical direction). For example, in the embodiment shown in FIG. 1 and the like, the bag detection sensor 32 may determine the arrival of a bag B at the detection position Pd, which is set between the central support base 30*a* and the first side support base 30*b* or between the central support base 30*a* and the second side support base 30*c* in the horizontal direction perpendicular to the traveling direction A2, and the control device 50 may obtain the "timing when the bag B reaches the detection position Pd" based on the detection result. Further, in the variant shown in FIG. 14 and the like, the first bag detection sensor 32*a* may determine the arrival of a bag B at the first detection position Pd1 which is set between the central support base 30*a* and the first side support base 30*b* in the horizontal direction forming a right angle with the traveling direction A, and the second bag detection sensor 32*b* may determine the arrival of a bag B at the second detection position Pd2 which is set between the central support base 30*a* and the second side support base 30*c* in the horizontal direction forming a right angle with the traveling direction A. The control device 50 may obtain "the timings (i.e., the first reference timing and second reference timing) when a bag B reaches the first detection position Pd1 and the second detection position Pd2 respectively" based on the detection results of the first bag detection sensor 32*a* and the second bag detection sensor 32*b*.

The support base 30 includes the central support base 30*a*, the first side support base 30*b* and the second side support base 30*c*, which are separated from each other, in the above-described embodiment, but two or more of these support bases may be provided in an integrated manner.

The surface of the support base 30 on which a bag B is placed (i.e., the support surface of the support base 30 which supports a bag B) may extend in the horizontal direction or may extend in a direction being inclined with respect to the horizontal direction (i.e., in a non-horizontal direction).

In the above-mentioned embodiment shown in FIG. 1 and the like, the first side support base 30*b*, the second side support base 30*c*, and each position adjustment support device 31 are moved by the single support drive device 33, but a plurality of support drive devices 33 may be used to move the first side support base 30*b*, the second side support base 30*c* and each position adjustment support device 31. For example, as in the above-mentioned first variant (see FIG. 14 and the like), the support base 30*b* and the associated position adjustment support device 31 may be moved by the first support drive device 33*a*, the first support drive rotation shaft 34*a*, the first engagement block 35*a* and the first support bracket 36*a*, and the second side support base 30*c* and the associated position adjustment support device 31 may be moved by the second support drive device 33*b*, the second support drive rotation shaft 34*b*, the second engagement block 35*b* and the second support bracket 36*b*.

The manner of holding a plurality of bags B in the bag storage device 11 is not limited.

The present invention is not limited to the above-described embodiments and variants. For example, various modifications may be added to each element of the above-described embodiments and variants. In addition, the configurations of the above-described embodiments and variants may be combined in whole or in part.

The invention claimed is:

1. A bag supply method including the steps of:

causing an arrangement device to arrange a bag at a pickup position;

delivering the bag from the pickup position to a support device via a bag pickup device;

moving the bag along with the support device in a traveling direction along a movement path including a detection position;

determining arrival of the bag at the detection position;

stopping the bag along with the support device on the movement path according to a timing when the bag arrives at the detection position; and delivering the bag stopped in the movement path, from the support device to a bag receiving device via a bag holding conveyance device, wherein, in the step of delivering the bag from the pickup position to the support device, the support device is configured to hold both side edges of the bag and support the bag from below, and the bag pickup device is configured to release holding of the bag.

2. The bag supply method as defined in claim 1, wherein the arrangement device is configured to arrange a plurality of bags held in a bag storage device one by one at the pickup position.

3. The bag supply method as defined in claim 1, wherein, in the step of delivering the bag from the pickup position to the support device, the bag pickup device is configured to hold the bag arranged at the pickup position by vacuum suction, and the bag pickup device is configured to move along with the bag in a state where the bag pickup device holds the bag by the vacuum suction in such a manner that the bag is moved from the pickup position.

4. The bag supply method as defined in claim 1, wherein, in the step of moving the bag along with the support device in the traveling direction, the support device is configured to move in the traveling direction while holding both side edges of the bag.

5. The bag supply method as defined in claim 1, wherein, in the step of delivering the bag from the support device to the bag receiving device, the bag holding conveyance device is configured to hold the bag being supported by the support device, and the bag holding conveyance device is configured to move along with the bag in a state where the bag holding conveyance device holds the bag, and the bag is released from holding by the support device.

6. The bag supply method as defined in claim 1, wherein the bag holding conveyance device is configured to hold one end of the bag with respect to the traveling direction, and wherein the bag receiving device is configured to hold both side edges of the bag.

7. A bag supply apparatus comprises:

an arrangement device configured to arrange a bag at a pickup position;

a bag position adjustment device configured to include a support device;

a bag pickup device configured to move the bag from the pickup position and deliver the bag to the support device;

a bag detection sensor configured to determine arrival of the bag at a detection position;

a bag receiving device; and a bag holding conveyance device configured to receive the bag from the support device and deliver the bag to the bag receiving device, wherein the support device is configured to move the bag in a traveling direction along a movement path including the detection position and stop the bag according to a timing when the bag reaches the detection position obtained from a detection result of the bag detection sensor, wherein the bag holding conveyance device is configured to carry the bag stopped in the movement path, from the support device to the bag receiving device, and wherein the support device is configured to hold both side edges of the bag and support the bag from below.

8. The bag supply apparatus as defined in claim 7, comprising a bag storage device configured to hold a plurality of bags, wherein the arrangement device is configured to arrange the plurality of bags held in the bag storage device one by one at the pickup position.

9. The bag supply apparatus as defined in claim 7, wherein the bag pickup device is configured to reciprocate between the pickup position and the bag position adjustment device, and wherein the bag pickup device is configured to hold the bag arranged at the pickup position by vacuum suction and move in a state of holding the bag by the vacuum suction to move the bag from the pickup position.

10. The bag supply apparatus as defined in claim 7, wherein the support device is configured to move in the traveling direction while holding both side edges of the bag.

11. The bag supply apparatus as defined in claim 7, wherein the support device includes:

a side edge support device configured to hold both side edges of the bag; and a lower support device configured to support the bag from below, and wherein the side edge support device is configured to be driven based on a hold mode in which the bag is held and on a release mode in which the bag is released.

12. The bag supply apparatus as defined in claim 7, wherein the support device includes:

a first side edge support device configured to hold one side edge of the bag;

a second side edge support device configured to hold another side edge of the bag;

a first support drive device configured to cause the first side edge support device to move back and forth in the traveling direction; and a second support drive device configured to cause the second side edge support device to move back and forth in the traveling direction, wherein each of the first side edge support device and the second side edge support device is configured to be driven based on a hold mode in which the bag is held and on a release mode in which the bag is released.

13. The bag supply apparatus as defined in claim 12, wherein, in the hold mode, each of the first side edge support device and the second side edge support device is configured to hold the bag while allowing rotation of the bag.

14. The bag supply apparatus as defined in claim 7, wherein the bag holding conveyance device is configured to hold one end of the bag with respect to the traveling direction, and wherein the bag receiving device is configured to hold both side edges of the bag.

* * * * *